United States Patent [19]
Fowler et al.

[11] Patent Number: 5,284,002
[45] Date of Patent: Feb. 8, 1994

[54] APPARATUS AND METHOD FOR MAKING A RECLOSABLE STORAGE BAG

[75] Inventors: Dwight P. Fowler, Middlefield, Conn.; Andrew McG. Martin, Boston, Mass.

[73] Assignee: Simple Packaging Solutions, Inc., Sausalito, Calif.

[21] Appl. No.: 997,701

[22] Filed: Jan. 14, 1993

Related U.S. Application Data

[63] Continuation-in-part of Ser. No. 842,845, Feb. 25, 1992, abandoned.

[51] Int. Cl.⁵ .................... B65B 61/18; B65B 9/06; B31B 23/90; B31B 23/64
[52] U.S. Cl. ......................................... 53/412; 53/451; 53/133.4; 53/133.8; 53/552; 493/194; 493/206; 493/927; 493/930
[58] Field of Search ............ 53/412, 451, 133.4, 53/133.5, 133.6, 133.7, 133.8, 551, 552, 373.7; 493/194, 197, 205, 206, 209, 923, 927, 930, 962, 963

[56] References Cited

U.S. PATENT DOCUMENTS

| | | | |
|---|---|---|---|
| 3,234,072 | 2/1966 | Dreeben | 53/552 |
| 3,311,288 | 3/1967 | Lemelson | 229/65 |
| 3,664,575 | 5/1972 | Lake | 229/62 |
| 3,779,139 | 12/1973 | White | 493/194 |
| 4,512,138 | 4/1985 | Greenawalt | 53/451 |
| 4,549,657 | 10/1985 | Martin | 206/610 |
| 4,630,429 | 12/1986 | Christine | 53/479 |
| 4,682,976 | 7/1987 | Martin et al. | 493/206 |
| 4,725,329 | 2/1988 | Tani | 156/436 |
| 4,936,817 | 6/1990 | Runge | 493/213 |
| 5,016,426 | 5/1991 | Davis | 53/554 |

*Primary Examiner*—William E. Terrell
*Attorney, Agent, or Firm*—Pearson & Pearson

[57] ABSTRACT

A storage bag and a method and apparatus for forming such a storage bag. The storage bag contains a reclosure tie formed as an integral marginal portion of the bag beyond an edge of the bag. The marginal portion includes overlying layers of bag material that form an elongated structure along an axis with first and second ends. A fused closure is formed in the marginal portion parallel to the axis and over a portion of the marginal portion spaced from one end thereof. This structure defines a tail and open loop that wrap around an opened bag thereby to close the bag in a positive fashion.

37 Claims, 14 Drawing Sheets

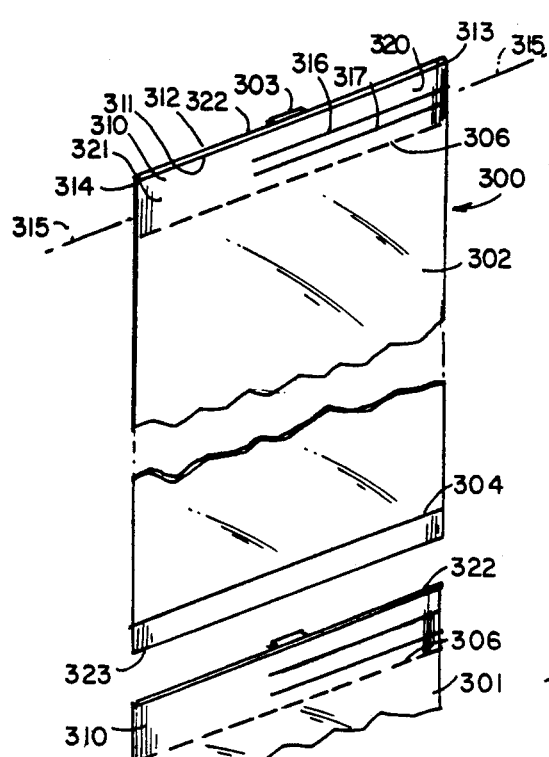
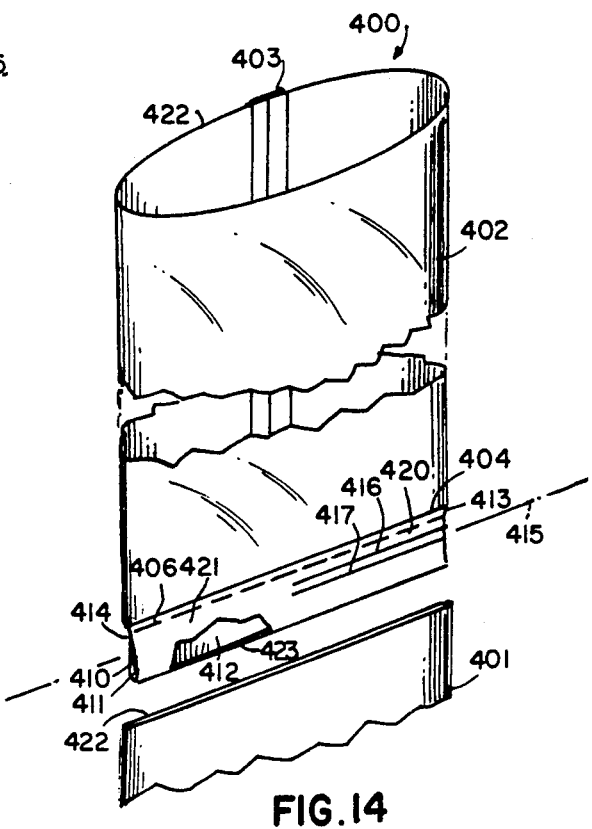
FIG.13
FIG.14
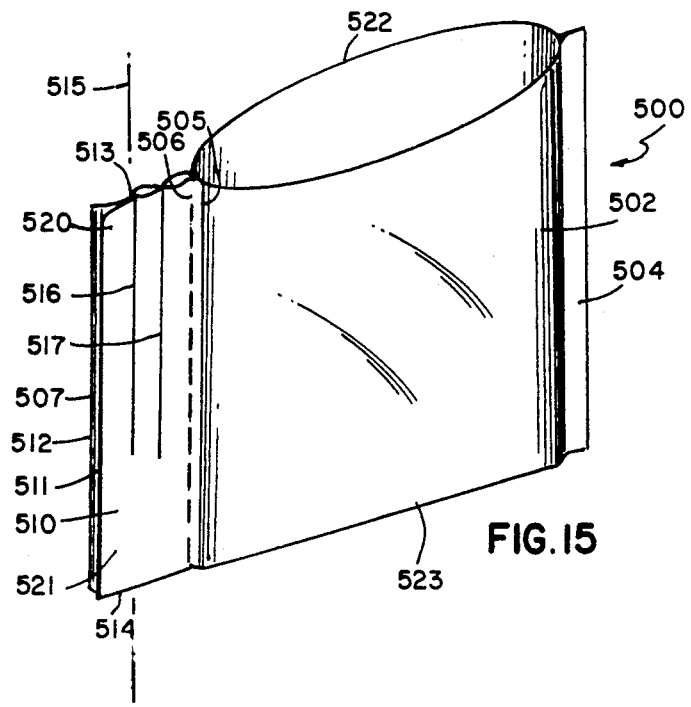
FIG.15

APPARATUS AND METHOD FOR MAKING A RECLOSABLE STORAGE BAG

CROSS REFERENCE TO RELATED APPLICATION

This application is a continuation-in-part application of copending application for U.S. Letters Patent Ser. No. 07/842,845 filed Feb. 25, 1992, abandoned, for Apparatus and Method for Making a Reclosable Storage Bag.

BACKGROUND OF THE INVENTION

1. Field of the Invention

This invention generally relates to packaging and more specifically to a storage bag that is easily reclosed and to the methods and apparatus for making such a storage bag.

2. Description of Related Art

There is a long-running effort to make a storage bag that is easily opened and then reclosed. This effort has led to criteria for judging the potential success of such storage bags. Consumers require that such bags must be easily opened, reclosed, and then reopened. The method of reclosure must be positive. From a manufacturer's standpoint, the method and apparatus required for forming the bag and reclosure structure must be easily added to a production line, operate without any appreciable reduction in production rates, add minimal production costs, have the capacity to be used with bags requiring a freshness seal and produce little or no waste material. Generally this prior effort has produced bags that either incorporate a separate reclosable tie or an integral structure that forms a tie.

The following patents are examples of bags with separate reclosure ties:

U.S. Pat. No. 3,311,288 (1967) Lemelson
U.S. Pat. No. 3,426,959 (1969) Lemelson
U.S. Pat. No. 3,674,135 (1972) Simon
U.S. Pat. No. 3,779,139 (1973) White Each Lemelson patent discloses packages with a tear strip of plastic or metallic foil. The tear strip may include a thread, string, wire or weld for added strength. The bag is reclosed by separating the tie from the bag and then wrapping and twisting the tie around the bag.

The Simon patent discloses a roll of separable bags. A line of perforations along an edge or top of each bag enables a section of the material to be removed for use as a reclosure tie or tear strip. The tear strip may be reinforced by one or more heat seals or by the application of separate strengthening materials such as string, deformable metal or another ply of film.

The White patent discloses a bag with a transverse tear strip that can be removed from the end of the bag. This tear strip then can be tied in an overhand knot to reclose the bag.

Each of the foregoing reclosure tie structures achieve some of the previously discussed criteria. Most are relatively easy to use in reclosing a bag. Twisted tie wraps are also relatively easy to remove in order to reopen the bag. Those tied with overhand knots may or may not be easy to open depending upon the ease with which the overhand knot releases. However, these approaches have not found great acceptance because they all incorporate special structures or require very specialized apparatus that can reduce production rates or increase materials and manufacturing costs unacceptably. For example, the White patent discloses the formation of a bag with a series of steps that is not readily adapted to continuous form and fill processes as conventionally used in the food industry and other industries. It requires special apparatus.

The following patents disclose packaging that uses integral tie strips that remain attached to a bag:

U.S. Pat. No. 3,217,971 (1965) Shvetz
U.S. Pat. No. 1,150,037 (1969) Plusplan (GB)
U.S. Pat. No. 3,480,198 (1969) Repko The Shvetz patent discloses a bag that opens along a transverse tear line that terminates inwardly of the edges of the bag to form a tie. A longitudinal tear line allows a portion of a reclosable tie to be separated into two halves such that the reclosure tie or strip forms two individual tie strips attached to opposite edges of the bag. The two ties can be knotted together. In another version a side strip formed along an edge of the bag can be partially separated to form a single tie strip.

The Plusplan patent discloses a similar structure in which a marginal section of a bag separates from the main portion of the bag along a tear line. However, the reclosure tie does not completely separate from the bag.

The Repko patent discloses a similar structure in which a marginal portion, with a weld or heat seal for strength, partly separates from a bag along a tear line defined by a series of apertures. The tear terminates at an end point, so the marginal portion remains physically attached to the bag.

Each of these structures either requires additional materials or prevents the bag from opening fully when the contents are to be dispensed. Moreover, the Repko patent requires a sophisticated structure for forming the plurality of apertures with seals intermediate and about each aperture to maintain any freshness seal.

The following patents disclose the bags in which a reclosure tie has an integral loop and tail section:

U.S. Pat. No. 3,664,575 (1972) Lake
U.S. Pat. No. 4,549,657 (1985) Martin
U.S. Pat. No. 4,609,107 (1986) Martin et al
U.S. Pat. No. 4,682,976 (1987) Martin et al
U.S. Pat. No. 4,787,517 (1988) Martin In accordance with the Lake patent a portion of a bag adjacent the top is formed with an intermediate seal that extends partially across the bag to form a tail of a reclosure tie. Another transverse seal spaced from the first seal joins the layers of film to form a loop section. This reclosure tie can be separated from the bag and then cinches the bag when the tail is wrapped around the bag and thread through the loop. However this reclosure tie is disclosed in connection with storage bags without freshness seals. That adaptation of this structure to a bag with a freshness seal could increase material costs unacceptably.

The Martin patents, U.S. Pat. Nos. 4,549,657 and 4,787,517, disclose a number of embodiments of easily opened and reclosable bags. Oppositely disposed sealing jaws form a closure seal with a reclosure tie and a freshness seal. The reclosure tie can be removed from the bag without disturbing the freshness seal. The bag is reclosed by wrapping the reclosure tie around the bag and extending one end through a loop formed at the intermediate section by the unsealed plies. In one embodiment it is suggested that the reclosure tie be formed as sealed plies of material except at an intermediate section offset to one end of the tie, thereby to form a tail.

In each of the Lake and Martin patents the loop section incorporates a seal. In many applications, particularly those involving polyethylene-based film bags, this seal is subject to failure. More particularly, as a cinching force is applied by the tail portion, a large portion of that force concentrates at an edge of the seal in the loop section. The seal then can begin to fail due to delamination of the plies and tearing of the material. When this occurs, the integrity of the loop section is lost and the reclosure tie no longer is functional.

The Martin et al patents, U.S. Pat. Nos. 4,609,107 and 4,682,976, disclose a reclosure tie formed as a tear strip across a top of a polypropylene bag in a margin portion beyond a freshness seal. The tear strip has a mold formed transversely in the bag for strength; it tears along a series of specially formed slots or perforations through the material in the margin portion beyond the freshness seal. In one embodiment a portion of the bag omits the mold proximate an edge thereby to provide a reclosure tie with a short mold channel and a loop spaced from one end. It is suggested that the other end of the reclosure tie pass through the loop as a tail to cinch the bag. Cinching, in this case, is also dependent upon an interaction of nubs formed on the edges of the reclosure tie. This approach is disclosed in connection with heat sealable, treated cellophane or other thin organic polymer materials. In fact, the bag has been used with polypropylene bags, but is not readily adapted for polyethylene-based bags. First, it is difficult to form a mold and channel in such material. Second, the cinching forces still act against a seal thereby incorporating a potential failure point.

SUMMARY

Therefore it is an object of this invention to provide a method and apparatus for manufacturing a reclosable bag that is easy to open and contains a reclosure tie that facilitates the subsequent closure and reopening of the bag.

It is another object of this invention to provide a method and apparatus for manufacturing a reclosable bag with an integral reclosure tie that does not require the addition of discrete elements or special components.

Another object of this invention is to provide a method and apparatus for manufacturing a reclosable bag with an integral reclosure tie that can be manufactured without the generation of waste materials.

Still another object of this invention is to provide a method and apparatus for manufacturing a reclosable bag and reclosing tie structure in which additional manufacturing costs are limited primarily to the cost of additional material.

Still another object of this invention is to provide a method and apparatus for manufacturing a reclosure tie for a reclosable bag in the form of an integral reclosure tie with a strong integral loop portion and a tail portion.

In summary and in accordance with one aspect of this invention a storage bag with a reclosure tie is produced by forming a sealable, elastic, polymeric film into an open-ended, hollow structure formed by walls of the film and extending along a first axis. A portion of the hollow structure is clamped along a second axis that is transverse to the first axis to form a margin portion in coextensive film wall portions. The margin portion has first and second sections disposed along the second axis to provide a boundary between successive storage bags. A line of perforations is formed in the margin portion that is parallel to the second axis. The film walls are also severed in the margin portion along a severance line that is parallel to in space from the second axis. The perforation and severance line define a removable closure tie between the perforation and severance lines and an adjacent first sealing area. A first seal is formed in the film walls along a line in the first sealing area that is parallel to the second axis and is coextensive with both the first and second sections. A second seal is formed in the removable closure that is parallel to the second axis and extends only across the first section whereby the film walls in the second section remain unsealed. The unsealed film walls are free of any film structure that fails by delamination.

In accordance with another aspect of this invention, apparatus forms storage bags from a continuous cylinder lying along a first axis and formed of a sealable elastic polymeric film. Each bag includes a contents pouch and an integrally formed reclosure tie for reclosing the bag. This apparatus includes a clamping structure for clamping a portion of the continuous cylinder along a second axis that is transverse to the first axis to form a margin portion in coextensive film wall portions of the continuous cylinder. The margin portion has first and second sections disposed along the second axis for providing a boundary between successive storage bags. A perforating structure perforates the film walls in the margin portion along a perforation line that is parallel to the second axis. A severing structure severs the film walls in the margin portion along a severance line that is parallel to and spaced from the second axis there by to form a removable closure tie in between the perforation and severance lines and an adjacent first sealing area. A first sealing structure forms a first seal between the film walls along a line in the first sealing area that is parallel to the second axis and that is coextensive with the first and second sections. A second sealing structure forms a second seal along a line in the removable closure tie that is parallel to the second axis and that extends only across the first end to form a tail in the removable reclosure tie. The film walls in the second section remain unsealed to form a loop that remotely to the tail is free of any film structure that fails by delamination.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 13 is a perspective view of an alternative embodiment of a storage bag shown in FIGS. 1 through 3;

FIG. 14 is another embodiment of a storage bag that utilizes this invention;

FIG. 15 is a perspective view of still another embodiment of a storage bag that utilizes this invention;

DESCRIPTION OF ILLUSTRATIVE EMBODIMENTS

Figure 1:
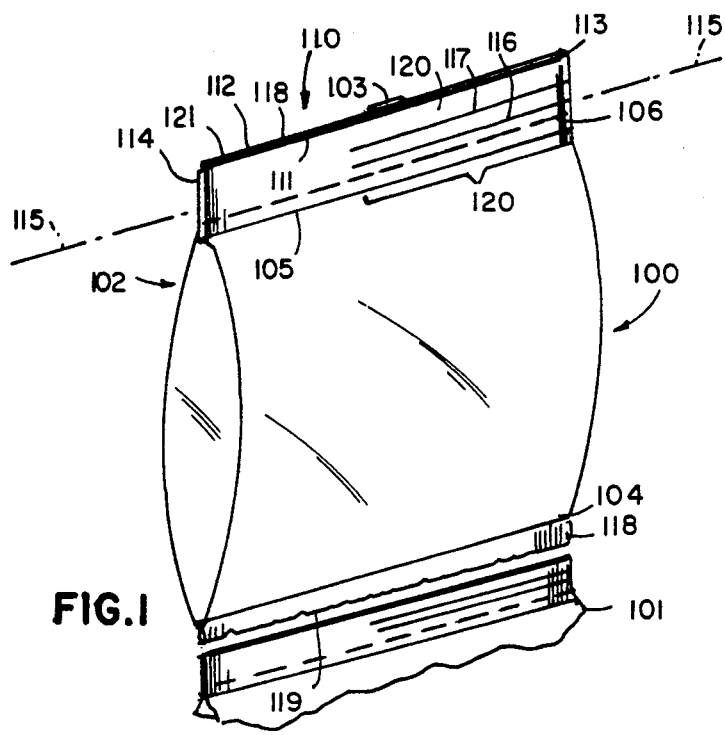
FIG. 1 is a perspective view of one embodiment of a storage bag constructed in accordance with this invention.

FIG. 1 of the drawings depicts a storage bag indicated generally at 100. Typically the bag 100 will be formed of an elastic coextruded polymer such as high density polyethylene and ethyl vinyl acetate or a copolymer including polyethylene. When heat is applied to adjacent film layers, the material seals, typically by fusing. These films are also characterized by reasonably high resistance to puncture and to the initiation of a tear. It is intended that the phrase "sealable elastic polymeric material" include all such polyethylene-based materials as well as other materials that exhibit similar characteristics. Such materials may also be co-extruded with other films for particular applications and still use the foregoing characteristics.

FIG. 1 also depicts an adjacent, or lower, bag 101 after as being severed from the bag 100 as occurs in a normal production of successive storage bags. Each bag has the same basic construction. Using the storage bag 100 as an example, the film forms a generally cylindrical open-ended pouch 102 comprising a sheet of a sealable elastic polymeric film wrapped around a cylinder. The edges overlap and produce a longitudinally extending back seam 103. A "bottom" seal 104 and a "top" seal 105 close the ends of the pouch 102 so the bag can store food or other articles. A perforation line 106 defines a boundary between the storage bag 100 and an attached, integral reclosable tie 110.

Specifically the reclosable tie 110 constitutes a margin portion and includes film layers on extensions 111 and 112 beyond the seal 105. The extensions 111 and 112 terminate at margin end portions 113 and 114 and the reclosure tie 110 lies along an axis 115 that parallels the top seal 105. Two fused seals 116 and 117 parallel the axis 115 and extend from the margin end 113 to a position intermediate the back seam 103 and the margin end 114 and spaced from the margin end 114. A top edge 118 of the extensions 111 and 112 constitutes a parting line for adjacent bag. Reference numeral 118 also designates the parting line for the bags 100 and 101.

The portion of the extensions 111 and 112 that are coextensive with the fused lines 116 and 117 along the axis 115 produce a tail portion 120 in which the layers 111 and 112 are fused together The remaining portions of the extensions 111 and 112 including the end 114 form a loop portion 121. As shown in FIG. 1, therefore, each of a series of storage bags such as storage bags 100 and 101 has an integral extension of the film forming two layers beyond a top seal line. The extensions form a tail and loop structure that can be readily torn from the bag along the perforation line 106.

Figure 3:
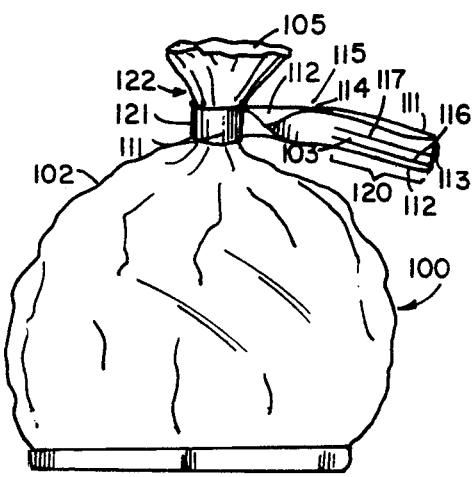
FIG. 3 is a view of the storage bag shown in FIG. 1 with the reclosure tie used for resealing the bag.
Figure 2:
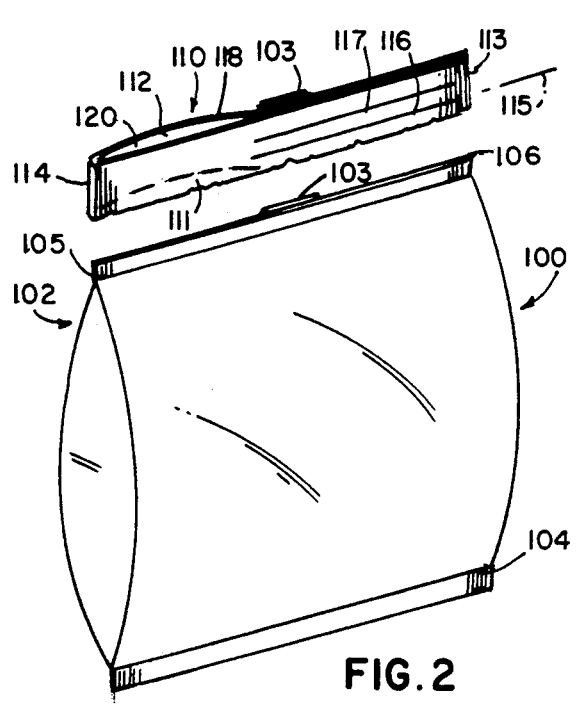
FIG. 2 is a perspective view of the storage bag shown in FIG. 1 with a reclosure tie removed.

To open the bag, a consumer tears the reclosable tie 110 from the bag 100 along the perforation 106 as shown in FIG. 2. Then the consumer separates the film layers along the top freshness seal 105 to open the bag fully. After some of the contents are removed, the individual gathers the bag 100 above the remaining contents to form a closed neck 122 as shown in FIG. 3, wraps the reclosure tie 110 around the neck 122 and passes the tail portion 120 through the loop portion 121. When the consumer pulls the tail portion 120, reclosure tie 110 slides longitudinally such that the loop 121 adjacent the margin end 114 slides along and tightens the noose formed around the gathered neck 122.

All pressure on loop 121 is applied against the end 114 that is free of any material that might otherwise delaminate, such as the back seam 103. When the loop 121 is firmly cinched in place and the tail portion 120 is released, the material, that stretched in tension, relaxes. The end margin 114 of the loop 121 cinches against the tail portion 120 thereby preventing its inadvertent loosening. However, as is characteristic in such loops, intentional release of the reclosure tie 110 is readily accomplished by sliding the end of the loop 121 toward the margin end 113 of the tail portion 120 thereby releasing the cinching action and enabling a consumer to readily remove the closure tie.

The bag 100 achieves all the above objects of this invention. The reclosure tie 110 is formed integrally with the bag during the bag forming and filling processing and only with a nominal amount of additional material. Thus, the cost of the bag 100 should not be significantly greater than that of a conventional bag without the reclosure tie 110.

Figure 4:
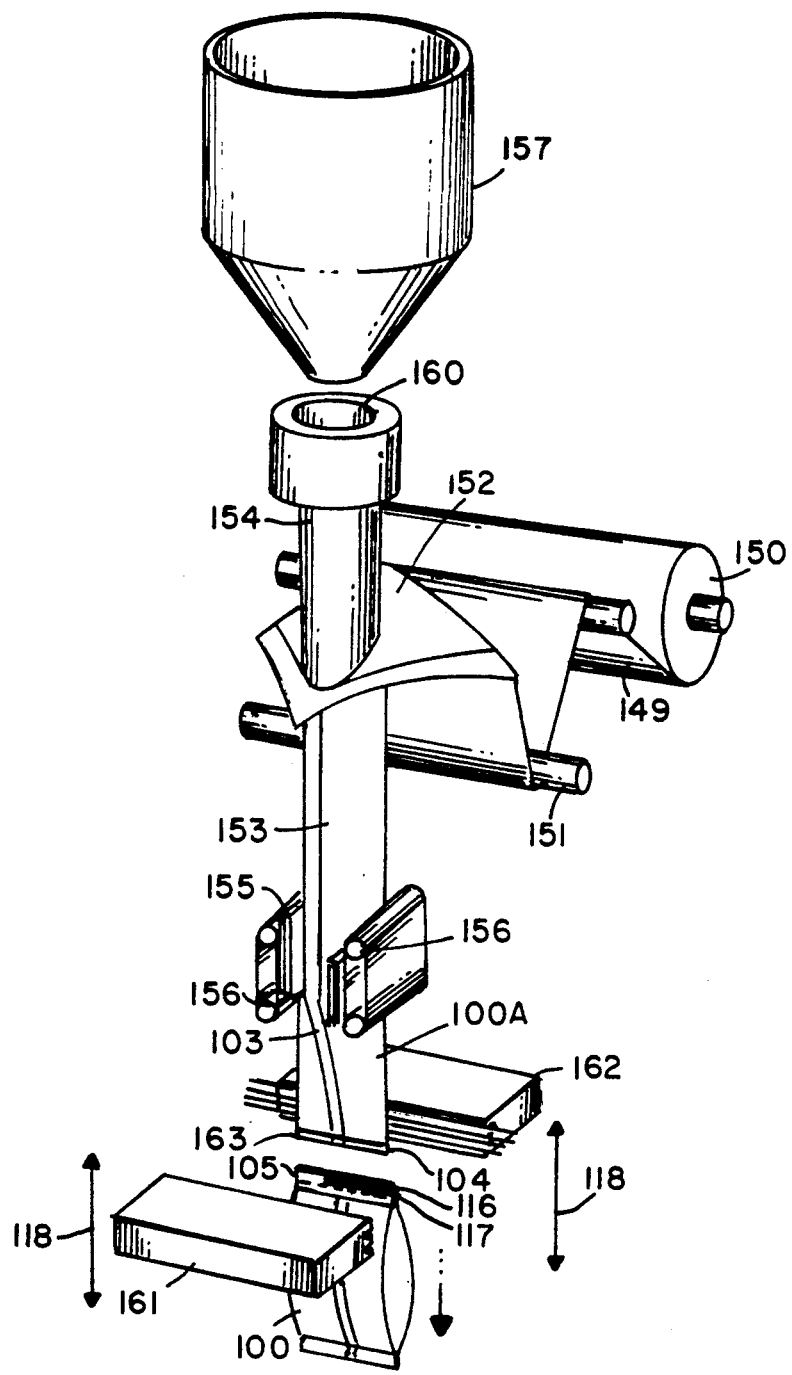
FIG. 4 is a perspective, in schematic form, of assembly equipment used for filing bags such as the storage bag in FIG. 1.

Moreover, conventional form, fill and seal pouch apparatus can produce bags, such as the bag 100 of FIGS. 1 through 3, successively without significant modification. As shown in FIG. 4, such apparatus passes fusible, elastic polymeric film 149 from a roll 150 past a guide roller 151 to a panning shoulder 152. The panning shoulder 152 forms the film 149 into a folded, double thickness, vertically moving web 153 about a cylindrical mandrel 154. Heat sealing apparatus 155 coacts with rollers 156 to insure formation of the back seam 103. Thus the panning shoulder 152 and the mandrel 154 transform film in sheet form into a continuously advancing open-ended cylindrical structure 153 that receives a measured amount of contents from a hopper 157 dispensed through a cylindrical passage 160 in the mandrel 154. The contents then fall into a pouch that has been formed above the bottom seal 104 by front and rear sealing jaws 161 and 162 that are shown only in diagrammatic form in FIG. 4.

More specifically, sealing jaws 161 and 162 initially are brought together (in a horizontal plane in FIG. 4) to grab the web material 153 from either side and then moved along the axis of the mandrel (vertically in FIG. 4) to pull the material 153 to a lower position. During this travel the bags initially are perforated and cut along lines 106 and 118. Then the sealing jaws form the upper seal 105 in the bag 100 and the lower seal 104 in the next bag 100A and the seals 116 and 117. The apparatus simultaneously dispenses contents from the hopper 157 to fill the bag 100A.

When the jaws 161 and 162 reach the bottom of travel along the mandrel axis they retract. At this point the lower bag, bag 100 in FIG. 4, drops away with its contents. The jaws 161 and 162 then move back along the mandrel axis to a position corresponding to the top of the filled bag. This is vertical motion shown by arrows 118 in FIG. 4. At the top of this motion the jaws again close and grab the web 153 above the fill contents and begin a next cycle to pull another section of film into appropriate position to form another bag.

With the exception of the sealing jaws 161 and 162, FIG. 4 depicts conventional form and fill processing equipment. In accordance with this invention, it is merely necessary to substitute new sealing jaws 161 and 162 in this conventional apparatus to provide bags as shown in FIGS. 1 through 3. The controls and actuating mechanisms that are involved with conventional heat sealing jaws remain substantially unchanged. blades 167 and 169 and recesses 168 and 170 in a stationary water jacket 172 receive the blades 167 and 169.

The second operation occurs when an electrical impulse passes through a set of parallel wires. More specifically the body portion 171 carries an upper pressure pad 173 that presses the web material 153 against a heating filament 174. A similar resilient pad 175 presses a portion of the web material around a lower heating filament 176. A single central pad 177 on the body portion 171 presses the web material 153 against parallel filaments 178 and 179. When these wires receive an electrical impulse, they produce sufficient heat to fuse the film at the wires. The filament 174 produces the bottom seal 104 in FIG. 1. The filament 176 produces the top seal 105 in FIG. 1. The filaments 178 and 179 produce the seals 116 and 117 shown in FIG. 1 that extend partially across the bag as described later.

SEALING JAWS—GRIPPING STRUCTURE

Figure 7:
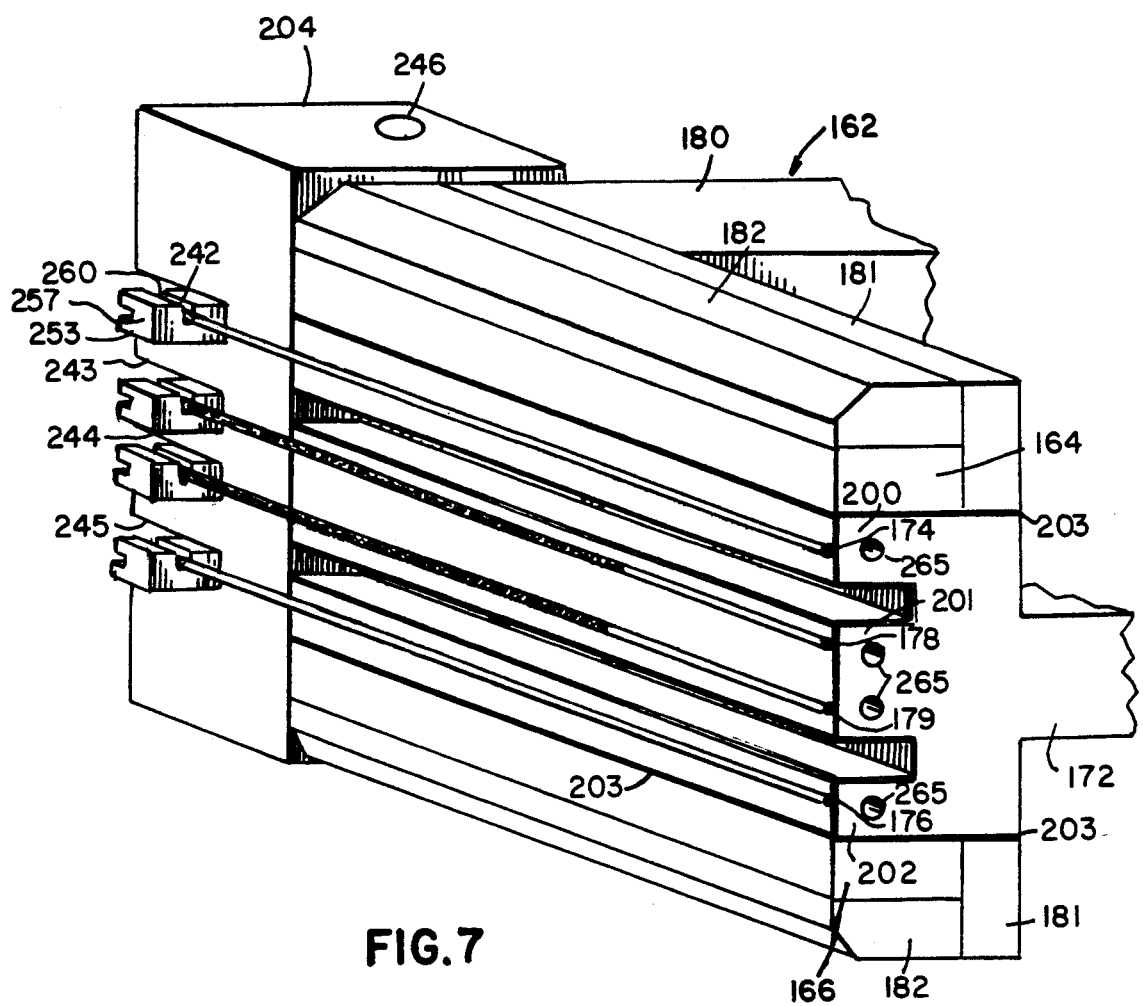
FIG. 7 is a perspective of a portion of a rear sealing jaw.
Figure 8:
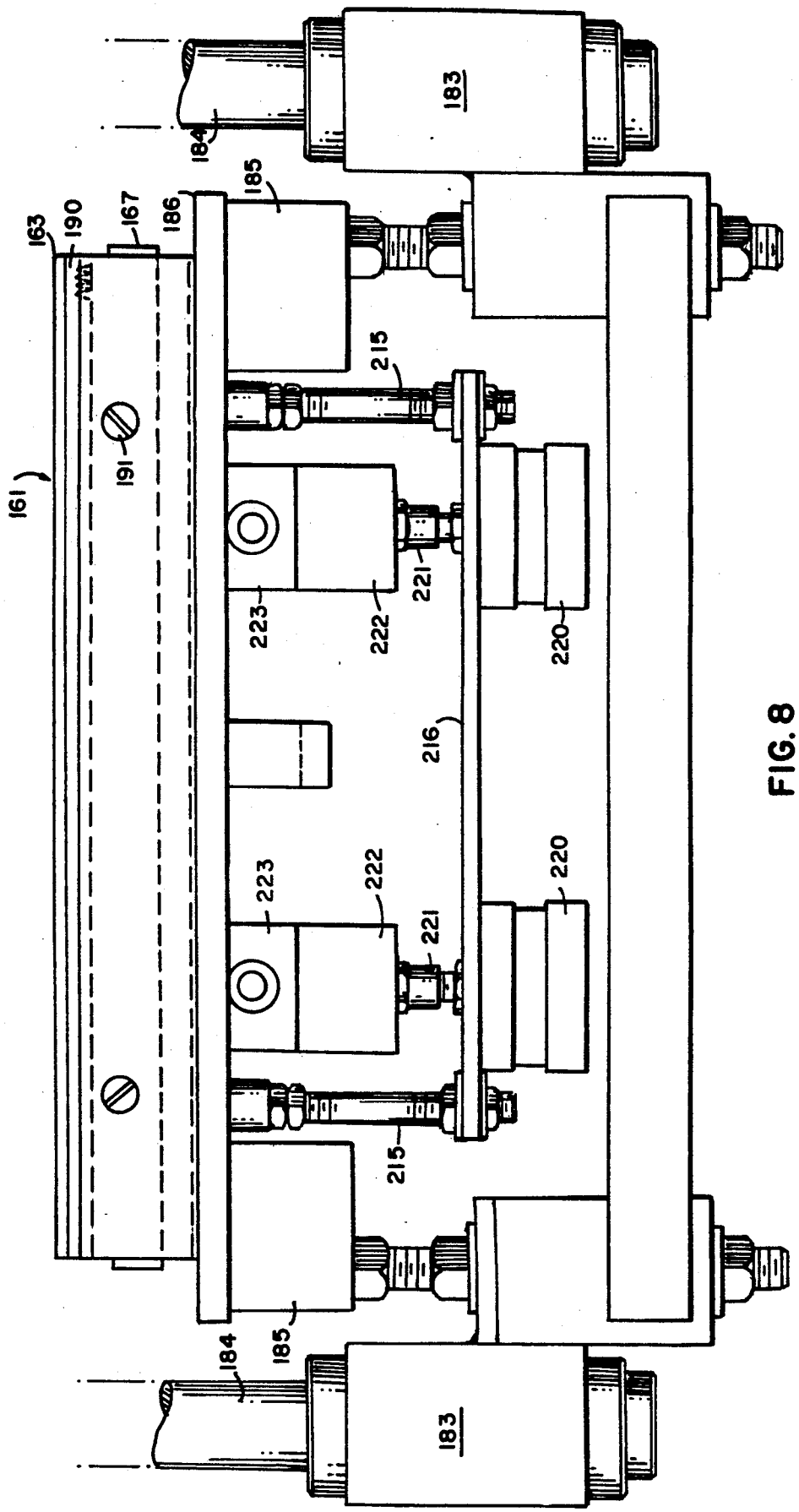
FIG. 8 is a top view of a portion of a front sealing jaw useful in accordance with the equipment shown in FIG. 4.

The structure of the rear jaw gripper bars can be seen by referring to FIG. 7. Both the upper and lower gripper bars 164 and 166 have the same basic structure therefore only the gripper bar 164 is described in detail. A frame member 180 supports the sealing jaw 162 and a mounting plate 181 attaches by bolting or other conventional means to the frame member 180. The mounting plate 181 extends across the width of the frame. An upper gripper plate 182 bolts or otherwise attaches across the face of the mounting plate 181 to form a secure L-shaped

SEALING JAWS

One function for the front and rear sealing jaws 161 and 162 is gripping the material of the web 153 to pull material down the mandrel for forming and filling a next bag. Referring to FIGS. 5 through 9, the front jaw 161 includes an upper gripper bar 163 that has a position corresponding to an oppositely facing upper gripper bar 164 in the rear jaw 162. The front and rear sealing jaws 161 and 162 additionally have lower oppositely facing gripper bars 165 and 166. When the sealing jaws 161 and 162 move from the retracted position shown in FIG. 5 to the closed position shown in FIG. 6, they engage and grip, or clamp, the web material 153. As previously described, web material between the upper and lower gripping bars constitutes a margin portion between the bottom of the upper bag and the top of the lower bag.

Figure 6:
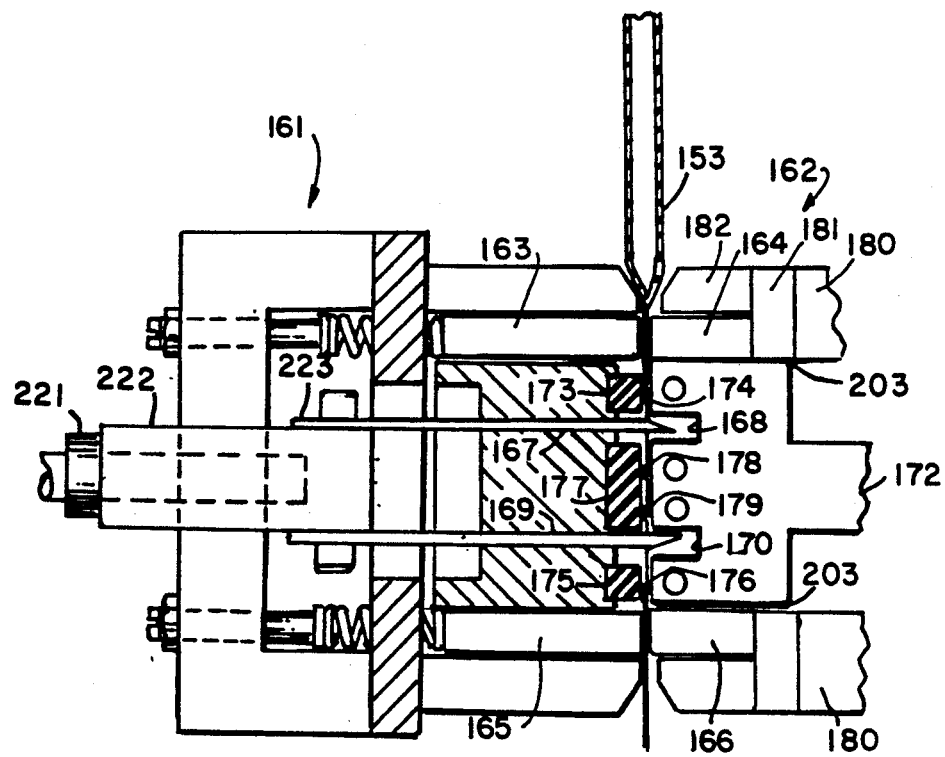
FIG. 6 depicts the sealing jaws in FIG. 5 moved to an operating position.

As the jaws 161 and 162 in the closed position shown in FIG. 6 pull along the mandrel axis, that is downward in FIG. 6, two operations occur. First, a cutting blade 167 in the front sealing jaw 161 advances through the web 153 into a recess 168 in the rear sealing jaw 162. This produces the parting line 118 shown in FIG. 1. Simultaneously a perforation blade 169 moves from a retracted position in the front sealing jaw 161 through the web material and into a recess 170 in the rear sealing jaw 162 thereby to form the perforation line 106 shown in FIG. 1. A front sealing jaw body portion 171 carries the mounting bracket for the upper gripper 164. The resulting rigid structure provides a front surface for the gripper bar 164 that stays in a vertical plane across the width of the rear sealing jaw 162.

Now referring to FIGS. 5, 6, 8 and 9, the front sealing jaw 161 mounts the upper and lower gripper plates 163 and 165 in a resilient fashion. More specifically, the front sealing jaw 161 includes a frame structure generally designated by reference numeral 183 that slides along rails 184 thereby to move from the position shown in FIG. 5 to the position shown in FIG. 6. The frame structure 183 includes a frame bracket 185 at each end of the front sealing jaw 161. A face plate 186 spans these two spaced brackets 185 and supports the various elements of the front heat sealing jaw including the gripper bars 163 and 165 and the pads 173, 175 and 177.

As the upper and lower gripper bars 163 and 165 have a symmetrical construction, these are described with a distinction and the same reference numerals identify like elements. Mounting bars 190 extend from and are bolted to the face plate 186 and to the brackets 185 to provide rigid supporting structures. Machine screws 191 thread into the upper gripper plates 190. Each of the upper and lower gripper bars 163 and 165 has at least two apertures 192 that are elongated along axes perpendicular to the face plate 186. These apertures 192 receive shoulder extensions 193 on each machine screw 191.

Figure 5:
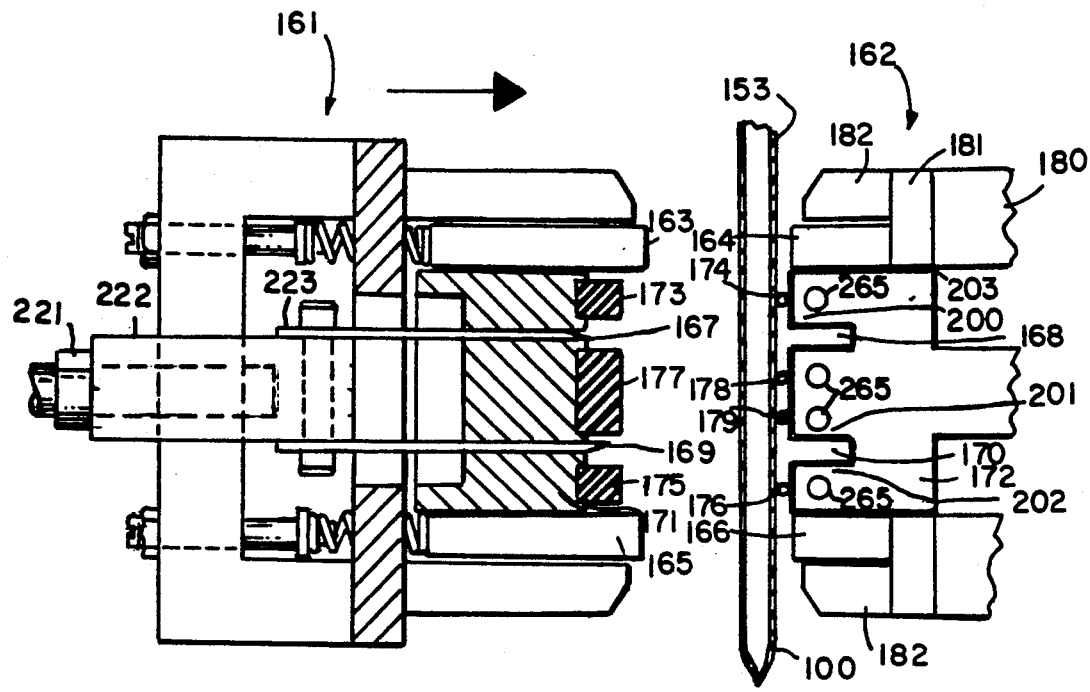
FIG. 5 is an side view of front and rear sealing jaws of FIG. 4 in a separated position.
Figure 9:
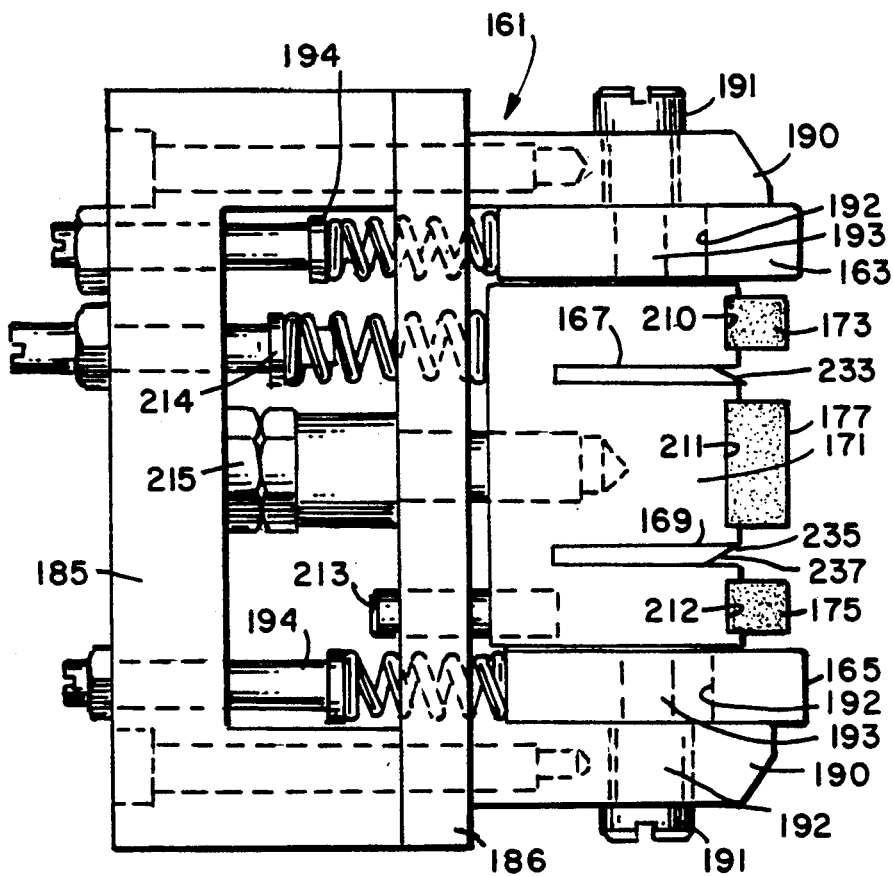
FIG. 9 is a side view of the front sealing jaw shown in FIG. 8.

Thus, the mounting bars 190 and the body 171 capture the upper and lower gripper bars 163 and 165 vertically, but permit horizontal motion over a limited range determined by the elongated apertures 192. Spring structures 194 mount to the bracket 185 and through the face plate 186 to urge the upper and lower gripper bars 163 and 165 to the right as shown in FIGS. 5, 6 and 9 when the sealing jaws 161 and 162 are retracted.

When a drive unit, not shown, moves the sealing jaw 161 toward the sealing jaws 162 along the rails 184, the ends of the upper and lower gripper bars 163 and 165 initially displace the web material 153 against the gripper bars 164. As the sealing jaw 161 moves to a final position, the upper gripper bars 163 and 164 and the lower gripper bars 165 and 166 begin to produce a clamping force. When the sealing jaws 161 and 162 come together, the contents in the web material 153 tension the web material 153 so the web material remains in essentially a vertical plane when gripping occurs.

More specifically, the upper gripper bars 163 and 164 and the lower gripper bars 165 and 166 make initial contact with the intermediate web 153. Thereafter the front seal bar 161 continues to move toward the rear seal bar 162 through an incremental distance until it reaches a mechanical stop (not shown). During this incremental motion, the gripper bars 163 and 165 displace horizontally on the shoulder extensions 193 and compress the spring mechanisms 194. Adjusting the spring mechanisms establishes the final gripping force that the gripper bars 163 through 166 exert on the web 153. This provides a firm grip on the web material 153 and enables vertical motion of the jaws, in the context of FIGS. 5 and 6, to pull additional web material from the mandrel 154.

SEALING JAWS—SEALING FUNCTION

The pads 173, 175 and 177 simultaneously press the web material 153 against the wires 174, 176, 178 and 179 respectively. With particular reference to FIG. 7, the rear water jacket 172 includes fingers 200, 201 and 202 that form the slots 168 and 170. A thermally-conducting insulating film 203 overlies the surface of the water jacket 172. This film extends between the upper gripper bar 164 and the water jacket 172, overlies all the surfaces facing the front sealing jaw 161 including the ends of the fingers 200, 201 and 202 and the surfaces forming the receiving slots 168 and 170 and then extends between the water jacket 172 and the lower griPper bar 166.

The finger 200 backs the heating wire 174; the film 203 electrically insulates the heating wire from the water jacket 172. Similarly, the finger 201 backs the wires 178 and 179 while the finger 202 backs the wire 176. A conductor support structure 204 at each end of rear sealing jaw 162 supports the wires across the face of the water jacket 172.

Referring now to FIGS. 5, 6 and 9, a slot formed at the end of each of fingers 210, 211 and 212 on the sealing pad body 171 carries the resilient pads 173, 177 and 175, respectively. The pads may be attached by adhesive or other means. Pins 213 support the body 172 for displacement with respect to the face plate 186. Other spring structures 214 bias the body 172 to the rear sealing jaw 162. When the jaws come together as shown in FIG. 6, the resilient pads 173, 177 and 175 initially press the web material against the heating wires 174, 178 and 179, and 176 respectively. The spring structures 214 limit the force that the pads exert against the material 153 and the wires by compressing as the body 171 shifts to the left with respect to the face plate 186 in FIG. 9.

Still referring to FIGS. 5, 6, 8 and 9, the seal pad body 171 also supports standoffs 215 that pass through apertures in the plate 186 and move with the body 172. The standoffs 215 shown in FIGS. 8 and 9 support a mounting bar 216 for pneumatically or electrically operated solenoids 220 with armatures 221. The armatures reciprocate along axes perpendicular to the face plate 186. Each armature 221 connects to a block 222 that attaches to tabs 223 on the cutting blade 167 and perforation blade 169.

When the solenoids 220 are not energized, the blades 167 and 169 are positioned as shown in FIGS. 5 and 9. Energizing the solenoids 220 advances the blades to a position shown in FIG. 6. Internal solenoid stops limit the displacement of the blades 167 and 169.

SEALING JAWS—CUTTING AND PERFORATION BLADES

Figure 10:
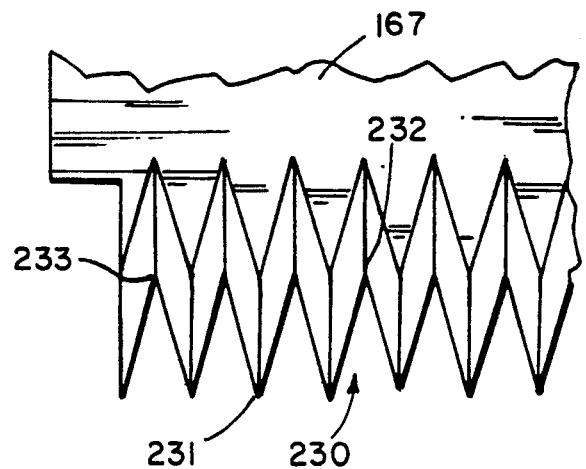
FIG. 10 is a view of a cutting blade used in the front sealing jaw of FIG. 7.

The cutting blade shown in FIGS. 9 and 10 comprises a plurality of vee-shaped teeth 230 ground into the surface of the blade 167. Each tooth has a vee-shape running from a front apex point 231 to a root 232. One surface, the lower surface 233 of the blade 167, is beveled. In one specific embodiment, the teeth have a pitch of about ⅛" and a depth of about ⅜" with a tooth angle of about 30° inclusive. When the blade 167 extends, it severs the material 153.

Figure 11:
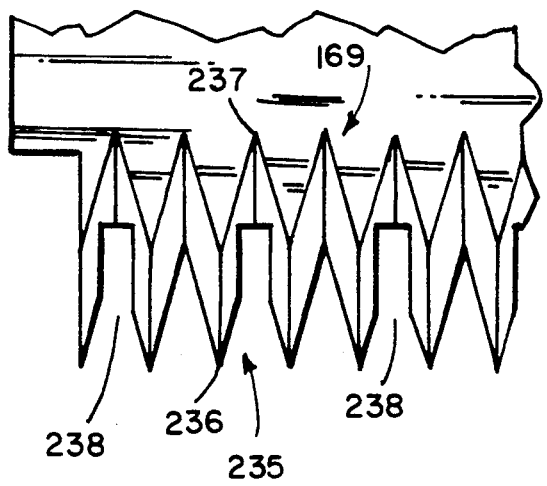
FIG. 11 is a view of a perforation blade used in the front sealing jaw of FIG. 7.

The perforation blade 169 shown in FIGS. 9 and 11 comprises a plurality of vee-shaped teeth that extend from a front apex 236 to a root 237. Notches 238 in alternate tooth sections extend toward the roots 237. When the blade 169 extends it initially produces a series of small apertures and each of the apertures begins to expand transversely as the blade 169 extends. However, when the blade 169 fully extends, it does not sever the web material 153 at positions corresponding to the notches. This produces a solid intermediate portion and the perforated line 105 in FIG. 1.

SEALING JAWS—HEATING WIRE SUPPORT

Figure 12:
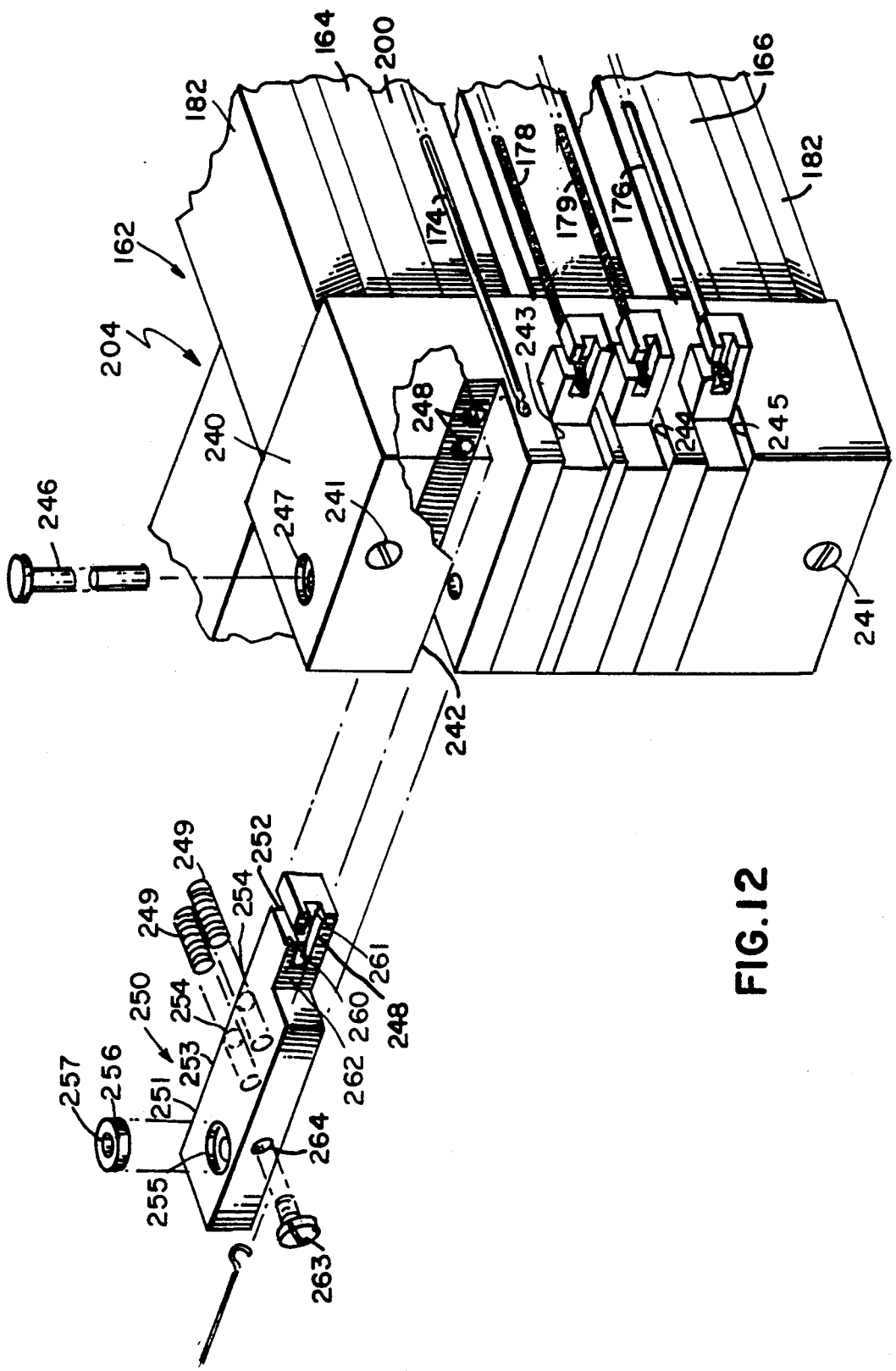
FIG. 12 is a perspective view partially in exploded form that discloses an end portion of the rear sealing jaw shown in FIG. 5.

FIGS. 7 and 12 illustrate a portion of the rear sealing jaw 162, particularly the conductor support structure 204 for the various heating wires. Each conductor support structure 204 includes an insulating block 240 with a mounting hole for a machine screw 241 or other device that affixes a block 240 to each end of the gripper mounting plates 182. Parallel slots 242, 243, 244 and 245 extend through the block 240 in alignment with the wires 174, 176, 178 or 179, respectively. A pivot pin 246 extends vertically through a pivot hole 247 in the block 240.

A pair of wells 248 in the bottom wall of each of the slots 242 through 245 seat springs 249 for pivoting toggle arms 250 in each of the slots 242 through 245 away from the water jacket 172. Each toggle arm 250 has a body portion 251 and an arm extension 252. An edge 253 common to the body portion 251 and the arm extension 252 contains two wells 254 that receive the other ends of the springs 249. An aperture 255 in the body portion 251 receives an annular spacer 256 with an aperture 257 that rotates about the pivot pin 246. When a toggle arm 250 and its springs 249 are properly mounted in one of the slots, such as slot 242, the springs 249 urge the arm 252 away from the center of the rear sealing jaw 162.

Each arm extension 252 contains a transverse slot 260 and a longitudinal recess 261 in a surface 262 that is spaced from the surface 253. The slots 260 and 261 receive the terminal structure of a heating filament. Thus, when the system is loaded, the springs 249 act on the toggle arms 250 at opposite ends of each filament to tensions the filament across the width of the sealing jaw 162.

The toggle 250 is conductive. A terminal screw 263 and aperture 264 provide a convenient means for connecting an electrical conductor to the toggle arm 251 thereby to complete a conductive path with an attached filament.

Referring to FIG. 7, the four filaments 174, 176, 178 and 179 extend completely across the rear heat sealing jaw 162 at the face of the fingers 200, 202 and 201 respectively. When power is supplied simultaneously to the four filaments, they heat instantaneously to a temperature that is sufficient to fuse the film pressed against those wires. A plurality of apertures 265 extend through each of the fingers 200, 201 and 202 proximate the ends thereof. Cooling water circulates through these passages to remove heat from the fingers and the filaments. As a result, the water-cooled jacket 172 localizes the heating and sealing to an area at the filament. Thus the filaments 174 and 716 fuse the materials essentially along a line and produce the linear seals 104 and 105 as shown in FIG. 1.

The filaments 178 and 179, however, are coated with a highly heat conducting material, such as silver solder, over a portion of each of the filaments 178 and 179 that is coextensive with the loop 121. The silver solder or equivalent coating dissipates heat from the filaments 178 and 179 to the water jacket 172. This limits the temperature to a level below that required for fusing the web material. The web material therefore remains unsealed along a line coextensive with the coated portion and forms the loop 121.

Still referring to FIG. 7, a plurality of apertures 265 extend through each of the fingers 200, 201 and 202 proximate the ends thereof. Cooling water circulating through these passages removes heat from the structure and allows the rear jaw and wires to cool between successive operations.

Sealing jaws as shown in FIGS. 5 through 11 produce bags having a structure as shown in FIG. 1 without significant modification to the form, fill and seal pouch apparatus. These sealing jaws operate with ancillary actuators and power sources that are in use in conventional apparatus. In accordance with the objects of this invention, the apparatus includes a cutting blade intermediate two sealing wires to close the ends of successive bags and sever successive bags. A perforation blade produces a tear line for facilitating the removal of a margin portion from an adjacent bag. A pair of sealing filaments between the cutting and perforation blades seal the margin portion only partially across the sealing jaws. So long as this partial seal crosses any back seal, a resulting loop structure is not subject to delamination. This margin portion is thereby readily detached from a bag to form a reclosure tie with a loop and tail structure.

ALTERNATIVE BAG EMBODIMENTS

FIG. 13 discloses an alternative bag structure that a consumer could buy in a folded or rolled configuration or in a package of individual bags. FIG. 13 shows two such storage bags 300 and 301 as they might be taken from a roll. The bag 300 has a film formed as a pouch 302 with a back seam 303 and a bottom seal 304. A perforation line 306 across the bag defines a margin portion or reclosable tie section 310 beyond the pouch 302. This embodiment has no freshness seal across the bag proximate the perforation line 306 such as the seal 105 in FIG. 1.

As in FIGS. 1 through 3, extensions 311 and 312 beyond the perforation line 306 form the reclosure tie. Margin ends 313 and 314 lie at opposite edges of a bag on a traverse axis 315. Seals 316 and 317 extend from the end 313 to a point beyond back seam 303 to produce a tail portion 320. The unsealed portion of the reclosure tie 310 forms a loop 321.

In this embodiment the bags are shown after separation from a continuous roll. A top edge 322 extends across the lower bag 301; a bottom edge 323 across the bag 300. If the bags are to be supplied on a continuous roll, the sealing jaws can form a perforated parting line coextensive with the top edge 322 and the bottom edge 323 that tears with less force than required to separate the reclosure tie 310 along the perforation line 306.

In use a consumer would separate the bag 300 from the roll or remove a bag 300 from a package. Then the consumer would tear the reclosure tie 310 off the bag along the perforation line 306. This would open the bag for full access. When the bag was filled, the consumer would twist the top of the bag to form a neck portion and use the reclosure tie 310 to cinch the bag closed at the neck.

FIG. 14 discloses a similar bag in which the reclosure tie and bag separate at the bottom, rather than at the top opening. With this approach it is possible to fill the bag without removing the reclosure tie. More specifically, FIG. 14 discloses two bags 400 and 401. A back seam 403 extends along the length of each bag. A bottom seal 404 forms a bottom of the bag. A perforation line 406 is formed across the bag proximate the seal 404 in the material that forms the reclosure tie 410. More specifically, film extensions 411 and 412 extend from the seal 404 thereby to form a reclosure tie with ends 413 and 414 centered on a transverse axis 415. Seals 416 and 417 are formed in the extensions from the edge 413 to a portion beyond the back seal 403. This forms a tail portion 420 and a loop portion 421. In this configuration each bag is open at the top 422. A bottom edge 423 and the top edge 422 form a parting line that may comprise a cut line for bags stored individually or a perforation line for bags stored on a roll.

Bags formed in accordance with this invention can also be formed by folding the film. As shown in FIG. 15, a bag 500 includes a pouch 502 formed of two layers of film. Parallel, spaced side seals 504 and 505 form the pouch 502. The seal 505, however, is disposed inwardly of an edge 507 of the bag to define a reclosure tie 510 formed by the film layers 511 and 512 between the seal 505 and the edge 507. The reclosure tie 510 has a structure that is similar to that shown in FIG. 1, namely ends 513 and 514 lie transverse to an axis 515 parallel to the seal 505. Seals 516 and 517 formed intermediate the perforation line 506 on the edge 507 form a tail portion 520 and leave loop portion 521. In this bag the top opening 522 is formed merely by the edges of the overlapped portion and a bottom closed portion of the bag 523 is formed by the bight when the two layers of film are folded over one another.

RESISTANCE HEATING APPARATUS

Apparatus in FIGS. 5 through 12 depict apparatus for producing storage bags with integral removable closure ties such as shown in FIG. 1 through using impulse heating techniques. It is also possible to form storage bags using resistance heating to form the seals. To distinguish impulse heating and resistance heating jaws, the following description uses reference numerals 161' and 162' to denote resistance heating jaws, even though FIG. 4 contains only reference numerals 161 and 162. As applied to the general structure shown in FIG. 4, resistance heating jaws, such as the jaws 161' and 162', initially close to grip the material as previously described with FIG. 4. Thereafter, a sealing jaw body portion including resistance heating elements extends to form seals, and a knife extends to sever adjacent bags. Then the knife and sealing jaws body retract prior to retraction of the sealing jaws 161' and 162' with the consequent release of the bag 100.

Figure 16:
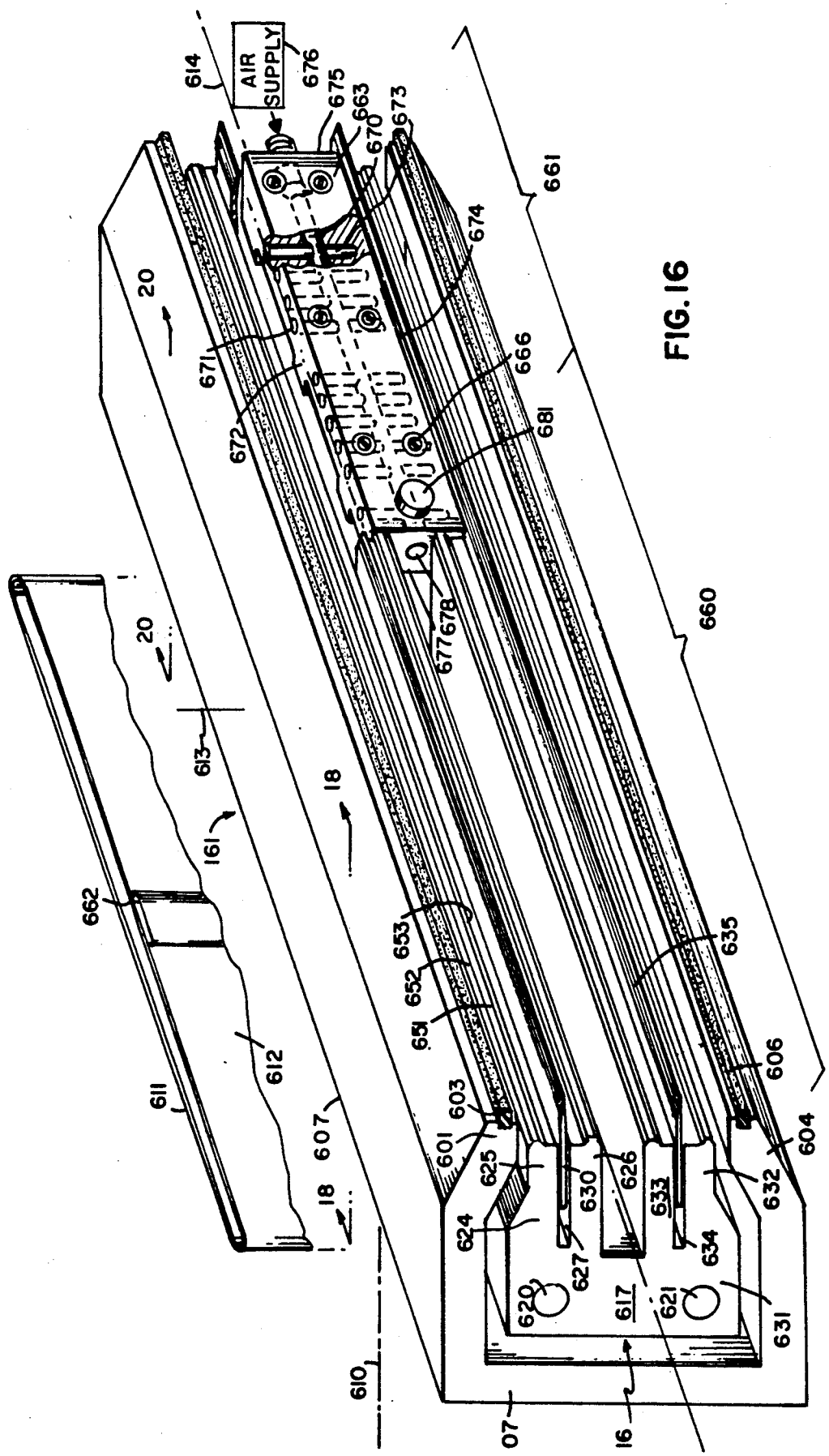
FIG. 16 is a perspective, in schematic form of a sealing jaw that utilizes resistance heating.
Figure 17:
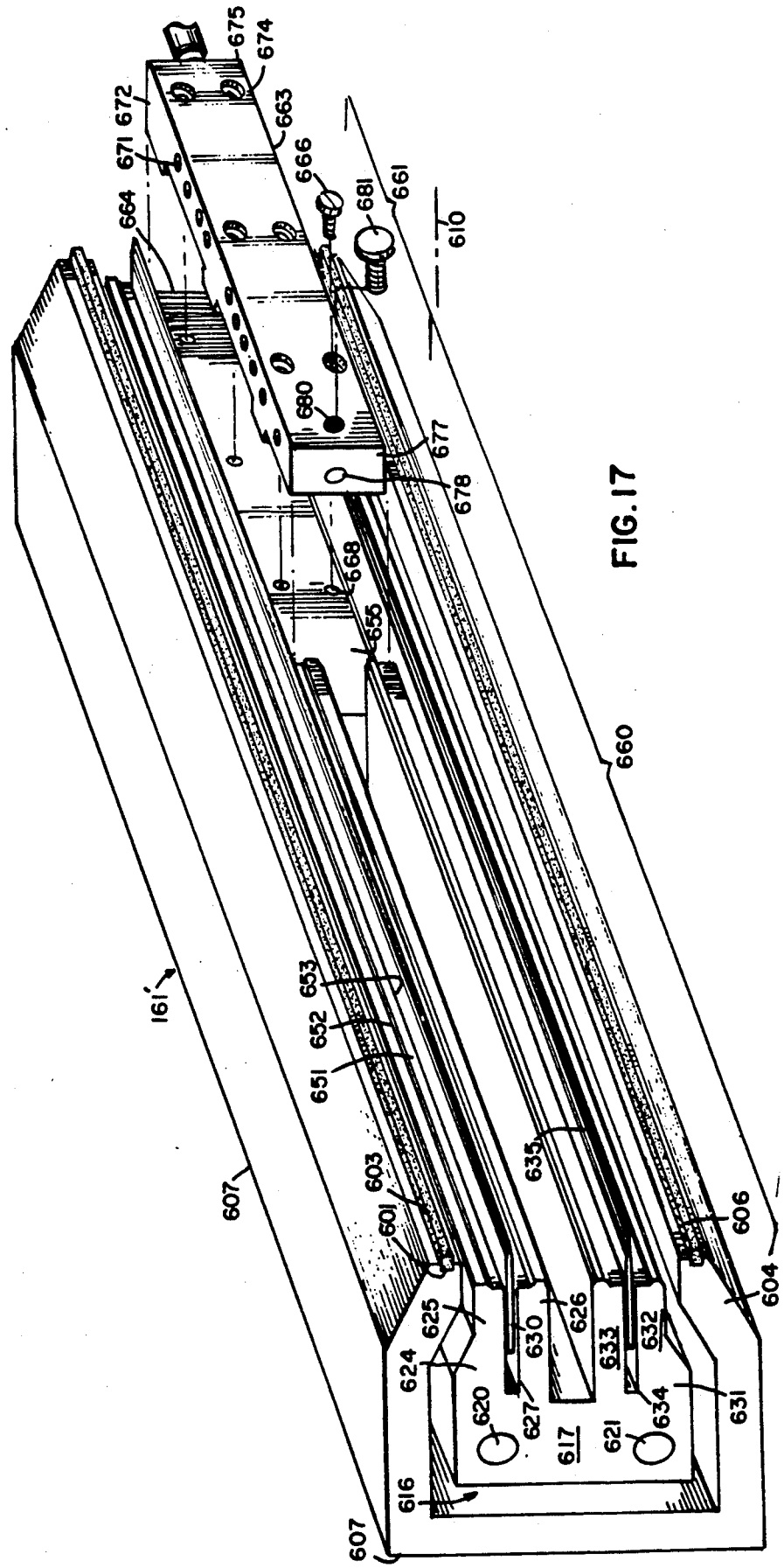
FIG. 17 is an exploded view of a portion of the sealing jaw shown in FIG. 16.
Figure 18:
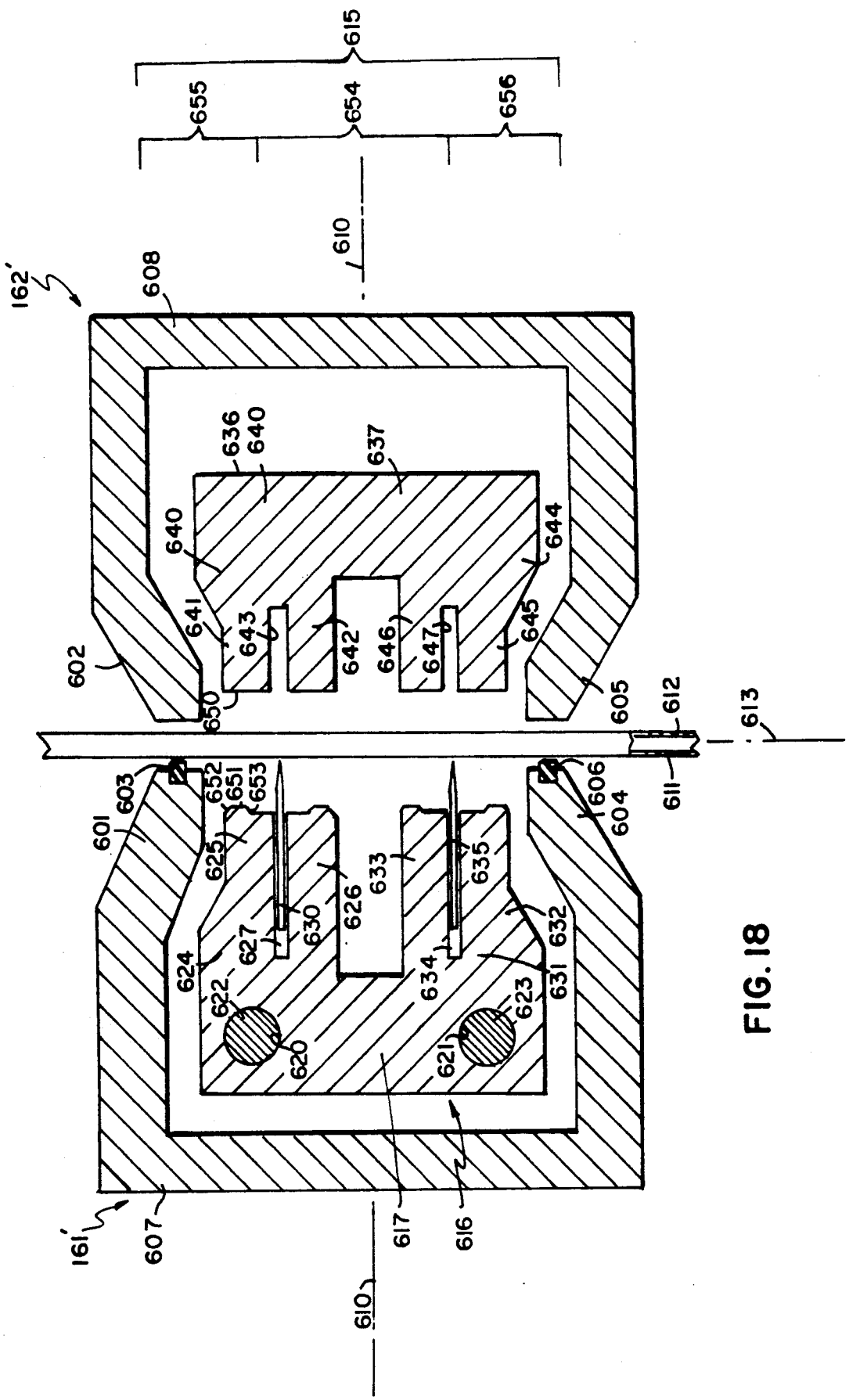
FIG. 18 is a cross-sectional view of front and rear sealing jaws in an open state and taken along lines 18—18 in FIG. 16.
Figure 19:
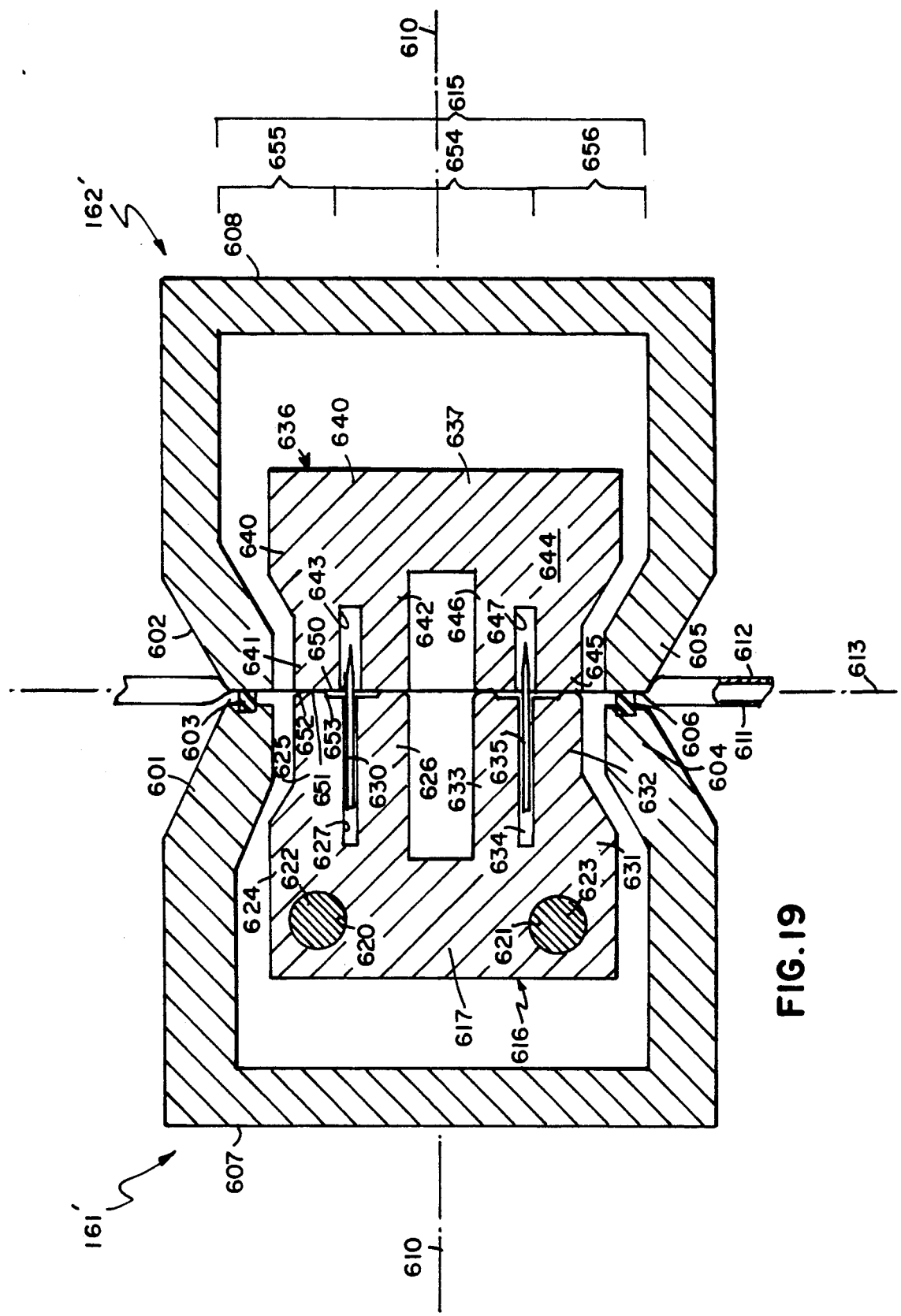
FIG. 19 is a cross-sectional view of the sealing jaws as shown in FIG. 18 in a closed position and taken along lines 18—18 in FIG. 16.
Figure 20:
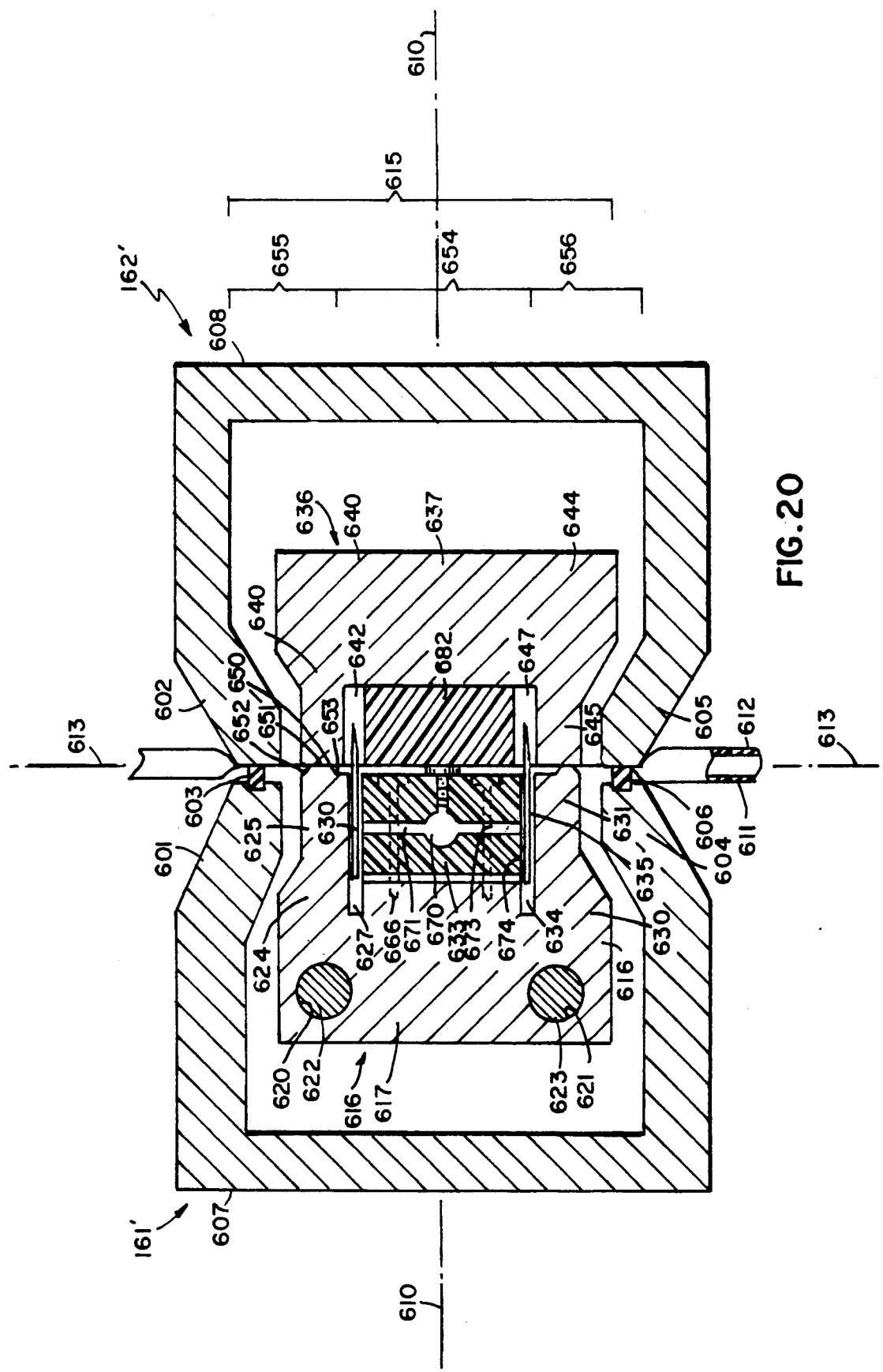
FIG. 20 is a cross-sectional view of the sealing jaws shown in FIG. 19, but taken along lines 20—20 in FIG. 16.

The apparatus as shown in FIGS. 16 through 20, depicts one specific embodiment of sealing jaws 161' and 162' that incorporate resistance heating techniques for the manufacture of bags with integral removable closure ties. This apparatus includes an upper gripper bar 601 on the front sealing jaw 161', an upper gripper bar 602 on the rear sealing jaw 162' and a compressible insert 603 that lies along one face of the upper gripper bar 601. The sealing jaws 161' and 162' have a symmetrical structure and include a lower gripper bar 604 on the front sealing jaw 161' and a lower gripper bar 605 on the rear sealing jaw 162'. A compressible insert 606 lies in the face of the lower gripper bar 604. The front sealing jaw 161' has a frame 607 that interconnects the upper gripper bar 601 and lower gripper bar 604. A similar frame 608 interconnects the upper gripper bar 602 and the lower gripper bar 605 for the rear sealing jaw 162'. Various mechanisms, not shown in these particular figures, independently reciprocate the sealing jaws 161' and 162' along an axis 610 between a retracted position such as shown in FIG. 18 and a closed position such as shown in FIGS. 19 and 20. Normally the axis is horizontal.

In the retracted position of FIG. 18, the upper gripper bars 601 and 602 and lower gripper bars 604 and 605 are disposed on opposite sides of two layers of film that form walls 611 and 612 of an open-ended hollow structure that extends along an axis 613. Normally the axis 613 is vertical. The gripper bars deflect the wall 611 and 612 from a cylindrical form leaving a mandrel, such as the mandrel 154 shown in FIG. 4, to a flattened form. In a closed position as shown in FIGS. 19 and 20, the inserts 603 and 606 engage the wall 611 and force it against the wall 612 and the faces of the upper and lower gripper bars 602 and 605 respectively.

As better understood by reference to FIGS. 16 and 17, this clamping action of the gripper bars 601 and 602 and the gripper bars 604 and 605 extends across the width of the bag and parallel to an axis 614 that is orthogonal to the axes 610 and 613. Normally the axis 614 is horizontal. Moreover, the portion of the walls 611 and 612 intermediate the insert 603 and 606 constitutes a margin portion 615 in co-extensive portions of the film walls 611 and 612 as shown in FIGS. 18 through 20. The margin portion, as previously indicated, provides a boundary between successive storage bags, such as storage bags 100 and 100A in FIG. 4.

The front sealing jaw, 161' also carries a sealing jaw body 616 that is reciprocal with respect to and movable with the frame 607. The sealing jaw body 616 includes a main body portion 617 that includes two cylindrical receptacles 620 and 621 that extend parallel to the axis 614. The receptacles 620 and 621 carry resistive heating elements 622 and 623 respectively, as shown in FIGS. 18 through 20. When energized, the resistance heating elements 622 and 623 elevate the temperature of the sealing jaw body 616 to some controlled level in accordance with techniques and apparatus that are well known in the art. Details of the heating controls and energizing apparatus are omitted from this description for purposes of clarity.

The main body portion 617 also supports an upper sealing arm 624 that further divides into an upper sealing finger 625 and an upper intermediate sealing finger 626. These sealing fingers extend generally parallel to the axis 614. A recess 627 intermediate the sealing fingers 625 and 626 receives a severing knife 630 of the type shown in FIG. 10. Other structures, again not shown but generally described with respect with FIGS. 5 through 12 are adapted to move the severing knife 630 with and relative to the sealing body portion 616. This is particularly shown in the sequence of operations shown in FIG. 18 and where initially the sealing jaw 616 moves to the position shown in FIG. 19 before other apparatus extends the knife 630 relative to the body 616.

The sealing body portion 617 also supports a lower arm sealing structure 631 that includes a lower sealing finger 632 and a lower intermediate sealing finger 633 that are also parallel to the axis 614. The sealing fingers 632 and 633 are also spaced and defined a recess 634 that receives and supports a perforating knife 635 of the type shown in FIG. 11. Like the severing knife 630, the perforating knife 635 can move with and relative to the sealing jaw body portion 617.

A rear sealing jaw body 636 shown in FIGS. 18 through 20, has a similar structure to the front sealing jaw body 616. More specifically, the rear sealing jaw body 636 includes a body portion 637 that has an upper arm 640 with an upper sealing fingers 641 and a spaced parallel upper intermediate sealing finger 642 extending in a plane, normally a horizontal plane, that is parallel to the plane defined by the axes 610 and 614 as shown in FIG. 16. The sealing fingers 641 and 642 are spaced by a recess 643. A lower arm 644 carries a lower sealing finger 645 and a lower intermediate sealing finger 646 that are also spaced apart by a recess 647 that lies in another plane parallel to the plane defined by the axis 610 and 614. Like the front sealing jaw body 616, the rear sealing jaw body 636 can move with and relative to the frame 608.

Each of the fingers 641, 642, 645, and 646 terminates in a flat end surface such as end surface 650 for finger 641 that lies in a plane, normally a vertical plane, that is parallel a plane defined by axes 613 and 614. Similarly, each of the sealing fingers 625, 626, 632 and 633 terminates in a vertical plane. Referring specifically to the sealing finger 625, an end surface 651 is formed as the apex of the finger 625 and is defined by an upper chamfer 652 and a lower chamfer 653. Like the structure shown in FIG. 7 where a thermally conductive insulating film 203 overlies the surface of the water jacket 172, the specific embodiment of FIGS. 16 through 20 can include a surface treatment for the end surfaces, such as the end surfaces 650 and 651. A coating or layer of a material, such as Teflon ®, will facilitate the release of the surfaces 650 and 651 from the walls 611 and 612 after the corresponding seals are formed.

When the front and rear sealing jaw bodies 616 and 636 are in a closed position as shown in FIG. 19 and the severing knife 630 and the perforating knife 635 have extended into the recesses 643 and 647 respectively, perforation, cutting and sealing operations occur. More specifically, the severing knife 630 severs the film wall 611 and 612 in the margin portion 615 along a severance line that is parallel to and spaced to the axis 614 shown in FIG. 16. It is analogous to the top edge 118 in FIG. 1. The perforating knife 635 perforates the film walls 611 and 612 in the margin portion 615 along a perforation line that is analogous to the perforation line 106 in FIG. 1 that is also parallel to the axis 614. The area of the margin portion between the severing knife 630 and the perforating knife 635 constitutes the removable closure tie 654 that corresponds to the reclosable tie 110 shown in FIG. 1. The sealing jaws 161' and 162' further define the adjacent areas that can be used for other sealing purposes. One such area 655 lies between the clamping point defined by the compressible insert 603 and the severing blade 630. Another sealing area 656 lies between the perforating knife 635 and the contact point defined by the compressible insert 606.

When the sealing jaws 161' and 162' close, and the front and rear sealing jaw body 616 and 636 also close as shown in FIGS. 19 and 20 to form a seal in each of the sealing areas 655 and 656 adjacent in the reclosable tie 654. As contact exists between the surface 651 and the edge 650 of the finger 641 across the entire width of the bag i.e., parallel to the axis 614, the heat transferred through the plastic film 611 and 612 fuses the walls 611 and 612 together to form a seal that corresponds to the seal 104 in FIG. 1. Likewise, the end surface of the finger 632 engages the end surface of the finger 645 thereby to produce a seal across the bag that corresponds to the seal 105 shown in FIG. 1. Both these seals are coextensive with the first section 660 and the second section 661 disclosed in FIGS. 16 and 17 and lie on the sealing areas 655 and 656 respectively.

The structure for forming seals, such as seals 116 and 117 in FIG. 1 incorporates the fingers in 626 and 633 on the front rear sealing jaw 161' and the fingers 642 and 646 on the rear sealing jaw 162'. As shown more specifically with respect to FIGS. 16 and 17 and for purposes of definition, the sealing jaws 161' and 162' can be considered to include a first section 660 and a second section 661 that are disposed along the axis 614. Any back seal such as the back seal 103 in FIG. 1, traverses the sealing jaws 161' and 162' parallel to the axis and in the first section 660. Thus where finger 625 and its corresponding sealing finger 641, and sealing finger 632 and its corresponding sealing finger 645 are coextensive with both the first section 660 and the second section 661, corresponding seals formed in the bag produce a seal that completely traverse the bag including any back seal, represented by a back seal 662 formed in the back wall 612 of a bag. However, the active heating area defined by sealing fingers 626 and 642 and sealing fingers 633 and 646 are coextensive with only the first section 660 shown in FIGS. 16 and 17. Essentially the length of these active heating areas along the axis 614 is such as to include the bag from one edge to a point beyond any back seal 662 such that the remaining portion of the reclosable tie 651 as shown in FIGS. 18 through does not contain the back seal 662 or any similar seam or seal. The transverse seals formed thereby correspond to the seals 116 and 117 shown in FIG. 1.

In order to obtain the loop 121 shown in FIG. 1, the portion of the sealing jaws in the second section 661 are modified as shown in FIGS. 16 and 17. Any extension of the sealing fingers 626 and 633 into the second section 661 is eliminated. The arms 624 and 631 are modified to receive an insulating insert 663 that is secured to a back surface 664 formed by removing material that otherwise would constitute an extension of fingers 626 and 633 into an area coextensive with the second section 661. The back surface 664 can be tapped such that machine screws, such as machine screw 666, can pass through apertures, such as aperture 667, in the inserts 663 to be secured in a tapped hole, such as tapped hole 668. A plurality of such securing structures typically are included.

Still referring to FIGS. 16 and 17, the insert 663 is formed of a heat insulating material. It includes a central air passage 670 that passes along through the insert 663 parallel to the axis 614. This passage serves as a header for a plurality of air passages 671 that extend to an upper edge 672 and a plurality of air passages 673 that extend to a lower edge 674 of the insert 663. An outer edge 675 includes a means for connection to an air supply 676. At an opposite end 677, a threaded aperture 680 extends parallel to the axis 610 and intersects the central air passage 670. A machine screw or valve screw 681 can be added to the structure to control the relative air flows between the apertures 671 and 673 and an exit aperture 678. Air leaving the exit aperture 678 flows toward the first section 660 and can be useful in the cooling the structure coextensive with the first section 660 immediately adjacent the second section 661. Air leaving the air passages 671 cools the severing knife 630 in the second section 661. Air leaving the air passages 673 cools the perforating knife blade 635 in the second section 661. This cooling prevents the temperature of the blades 630 and 635 from reaching a value at which their contact with the walls 611 and 612 could produce any sealing in the second section 661.

Referring to FIG. 20, the rear sealing jaw 162 has a similar modification. Sealing fingers 642 and 646 are relieved to receive a heat insulating block 682 that is coextensive with the second section 661. Consequently when the jaws 161' and 162' reach the position shown in FIGS. 19 and 20, the temperature of the inserts 663 and 682 at the surfaces that contact the walls 611 and 612 remains below the fusing temperature for the film.

When the sealing jaws 161' and 162' separate, the area of the bag that falls from the jaws 161' and 162' contains a reclosable tie with a structure that is similar to the structure shown in FIGS. 1 and 2.

The heat sealing fingers 626 and 642 and the heat sealing fingers 632 and 646 have formed second seals, between the film wall 611 and 612. These seals are formed in the removable closure tie section 654 that is parallel to the axis 614. They are coextensive with only the first section 660. The insulating inserts 663 and 682 assure that the second section 661 remains unsealed. Moreover, as the unsealed portion does not include any back seal or similar structure, the resulting loop formed in the second section 661, such as the loop 121 shown in FIG. 1, is formed as a monolithic polymer film layer from the tail and produces a structure remote from the tail that is free of any film structure that can fail by delamination.

In operation, mechanisms actuate the various components of the sealing jaws 161' and 162' in any of a number of sequences. Typically the sequence for closing the jaws 161' and 162', drawing the clamped bag material downwardly over the mandrel 154 as shown in FIG. 4, producing the heat sealing, cutting and perforating operations, releasing the bag by retracting the heat sealing jaws 161' and 162' and returning them to an upper position constitutes a cycle that is divided into 360°. Assuming 0° corresponds to the initiation of the closure of the heat sealing jaws 161' and 162', the following represent two possible operating sequences:

| OPERATION | CYCLE | |
|---|---|---|
| | PROCEDURE 1 | PROCEDURE 2 |
| Sealing jaws 161' and 162' closed | 95°-330° | 95°-300° |
| Sealing jaw bodies 616 and 636 closed to form seals | 120°-290° | 90°-305° |
| Severing knife 630 and perforation knife 635 | 230°-290° | 50°-316° |

| | CYCLE | |
|---|---|---|
| OPERATION | PROCEDURE 1 | PROCEDURE 2 |
| extended | | |

Procedure 1 is based upon prior art operations. Initially, the sealing jaws 161' and 162' close to the position shown in FIGS. 19 and 20 to grip the wall 611 and 612 thereby defining the margin portion 615. Subsequently the front and rear sealing jaw bodies 616 and 636 close to the position shown in FIG. 19 by moving relative to the frames 607 and 608 respectively thereby to begin a sealing operation. Other apparatus corresponding to the solenoids 220 in FIG. 8 next drives the severing blade 630 and perforating blade 635 from the recesses 624 and 627 as shown in FIG. 18 to the position shown in FIGS. 19 and 20 where the blades 630 and 635 pass through the walls 611 and 612 and enter the recesses 643 and 647. Typically the severing and perforating blades 630 and 635 extend simultaneously. After a short dwell interval the solenoids 220 (FIG. 8) and similar apparatus retract the severing and perforating knives 630 and 635 into the recesses 627 and 634 and separate the heat sealing jaw bodies 616 and 636. Thereafter other apparatus retracts the sealing jaws 161' and 162' along the axis 610 to complete the operation and release a lower bag, such as the bag 101 in FIG. 1.

In accordance with Procedure 2, the severing knife 630 and perforation knife 635 extend in advance of any clamping operation. Then the sealing jaws body 613 and 636 close to initiate heat sealing followed immediately by the closure of the jaws 161' and 162' to produce the clamping operation. At the end of this operation the sealing jaws 161' and 162 retract. Then the sealing jaws body 161 and 636 retract followed by the severing and perforation knives 620 and 635. Consequently, during the initial and ending sequences of Procedure 2, the perforation knife 635 holds the lower bag, such as the bag 101 in FIG. 1, in place vertically and subsequently releases the bag rather than the gripper bars 601 and 602 and the gripper bars 604 and 605.

Procedure 1 and Procedure 2 represent specific examples of various operating sequences. Other sequences can be utilized. A particular selection will depend upon bag size, the thickness of the walls 611 and 612, operating speed and other considerations.

In summary there have been disclosed diverse embodiments of storage bags with integral reclosure ties and apparatus for effecting methods of manufacturing certain of these embodiments. Each embodiment provides a bag that is easy to open. Each bag contains a reclosure tie that facilitates subsequent closure and re-opening of the bag. The bag, with its integral reclosure tie, does not require the addition of any discrete elements or special components. Manufacturing does not produce waste materials and any additional manufacturing costs are limited primarily to the cost of additional material in a small margin portion. In each bag the reclosure tie is readily detached and used and, with its strong integral loop portion and tail portion, provides a secure and an easy to use reclosure structure.

It will be apparent that many modifications can be made to the disclosed apparatus without departing from the invention. The location and orientation of reclosure ties can vary among different bags. Bags may or may not have back seals or seams. If bags do not have back seals or seams, the extension of the partial seals can be varied for optimizing different relationships between the lengths of the loop and tail portions. Bags may or may not contain freshness seals at either opening. Alternate methods, operating sequences and apparatus may also be substituted for the specifically disclosed methods and apparatus with the attainment of some or all of the specific advantages of the disclosed embodiments. Therefore, it is the intent of the appended claims to cover all such variations and modifications as come within the true spirit and scope of this invention.

What is claimed as new and desired to be secured by Letters Patent of the United States is:

1. A method for forming successive storage bags from an indeterminate length of polyethylene-based film, each storage bag having a removable closure tie, said method comprising the steps of:
   A. forming the film into a wall of an open-ended, hollow structure extending along a first axis,
   B. clamping a portion of the hollow structure along a second axis that is transverse to the first axis to form a margin portion in coextensive film wall portions, said margin portion having first and second sections disposed along the second axis and providing a boundary between successive storage bags,
   C. perforating the film walls in said margin portion along a perforation line that is parallel to the second axis,
   D. severing the film walls in the margin portion along a severance line that is parallel to and spaced from the second axis thereby to form a removable closure tie between the perforation and severance lines and to form an adjacent first sealing area,
   E. forming a first seal between the film walls along a line in the first sealing area that is parallel to the second axis and that is coextensive with the first and second sections,
   F. forming a second seal between the film walls along a line in the removable closure tie that is parallel to the second axis and that is coextensive with only the first section whereby the film walls in the second section remain unsealed and the unsealed film wall is free of any film structure that fails by delamination.

2. A method for forming storage bags as recited in claim 1 wherein said method additionally comprises the step of unclamping the film upon completion of said perforating, severing and sealing steps thereby to release an individual storage bag.

3. A method for forming storage bags as recited in claim 2 wherein said perforating and severing steps occur substantially simultaneously and wherein said seal forming steps occur substantially simultaneously.

4. A method for forming storage bags as recited in claim 1 wherein said step of forming the film into the structure includes the steps of:
   i. wrapping the film in sheet form about a cylinder,
   ii. overlapping edges of the film parallel to the first axis, and
   iii. sealing the edges into a back seal parallel to the first axis thereby to produce the open-ended, hollow structure that traverses the margin in the first section remotely from the second section.

5. A method as recited in claim 1 wherein said step of forming the second seal includes forming in the removable closure tie two spaced, parallel seals that are parallel to the second axis and are coextensive with only the first section.

6. A method as recited in claim 5 wherein said steps of forming said first and second seals includes the step of impulse heating the film layers.

7. A method as recited in claim 5 wherein said steps of forming said first and second seals includes the step of resistance heating the film layers.

8. A method for forming storage bags as recited in claim 1 wherein the perforation line defines a boundary between the removable closure tie and an adjacent second sealing area and wherein said step of forming the first seal forms a seal in the second sealing area that is coextensive with the first and second sections.

9. A method as recited in claim 8 wherein said steps of forming said first and second seals includes the step of impulse heating the film layers.

10. A method as recited in claim 8 wherein said steps of forming said first and second seals includes the step of resistance heating the film layers.

11. A method as recited in claim 1 wherein said step of forming the film into the structure includes the step of:
  i. wrapping the film in sheet form about a cylinder,
  ii. overlapping edges of the film parallel to the first axis, and
  iii sealing the edges into a back seam parallel to the first axis that traverses the margin portion in the first section remotely from the second section and produces the open-ended, hollow structure, wherein said perforating and severing steps occur substantially simultaneously, and wherein said seal forming steps occur substantially simultaneously, and wherein said step of forming the second seal includes forming in the removable closure tie two spaced, parallel seals that are parallel to the second axis and coextensive with only the first section.

12. A method as recited in claim 11 wherein said steps of forming said first and second seals includes the step of impulse heating the film layers.

13. A method as recited in claim 11 wherein said steps of forming said first and second seals includes the step of resistance heating the film layers.

14. A method for forming storage bags as recited in claim 11 wherein the perforation line defines a boundary between the removable closure tie and an adjacent second sealing area and wherein said step of forming the first seal forms a seal in the second adjacent sealing area that is coextensive with the first and second sections.

15. A method as recited in claim 14 wherein said steps of forming said first and second seals includes the step of impulse heating the film layers.

16. A method as recited in claim 14 wherein said steps of forming said first and second seals includes the step of resistance heating the film layers.

17. Apparatus for forming, from a continuous cylinder lying along a first axis and formed of a sealable, elastic polymeric film, storage bags with contents pouches and integrally formed, reclosure tie means for reclosing each bag, said apparatus comprising:
  A. clamping means for clamping a portion of the continuous cylinder along a second axis that is transverse to the first axis to form a margin portion in coextensive film wall portions of the continuous cylinder, said margin portion having first and second sections disposed along the second axis for providing a boundary between successive storage bags,
  B. perforating means for perforating the film walls in said margin portion along a perforation line that is parallel to the second axis,
  C. severing means for severing the film walls in the margin portion along a severance line that is parallel to and spaced from the second axis thereby to form a removable closure tie in the margin portion between the perforation and severance lines and to form an adjacent first sealing area,
  D. first sealing means for forming a first seal between the film walls along a line in the first sealing area that is parallel to the second axis and that is coextensive with the first and second sections,
  E. second sealing means for forming a second seal between the film walls along a line in the removable closure tie that is parallel to the second axis and that is coextensive with only the first section to form a tail in the first section and to form a loop in the second section that is free of any film structure that fails by delamination.

18. Apparatus for forming storage bags as recited in claim 17 wherein said clamping means includes first and second counterfacing sealing jaw means mounted for relative movement along a third axis that is transverse to the first and second axes, each of said sealing jaw means including spaced, transversely oriented, counterfacing gripper means parallel to the second axis for clamping the film thereby to form the margin portion therebetween.

19. Apparatus for forming storage bags as recited in claim 18 wherein one of said sealing jaw means includes means for biasing said gripper means toward the other of said sealing jaw means, said gripper means on said one sealing jaw means being displaced during a clamping action whereby said biasing means establishes a clamping force.

20. Apparatus for forming storage bags as recited in claim 18 wherein said first and second sealing means includes a plurality of spaced heating filaments disposed parallel to the second axis and wherein one of said sealing jaw means includes means for supporting said filaments and the other of said sealing jaws means includes filament clamping means for placing the film against said filaments, said filament clamping means being biased on said supporting sealing jaw means for limited reciprocation with respect thereto to establish the clamping force against said filaments, said apparatus additionally including means for directing an electrical current pulse through said filaments.

21. Apparatus for forming storage bags as recited in claim 20 wherein said second sealing means includes one of said filaments having an insulator formed over a portion thereof coextensive with the loop thereby to prevent a heat transfer to the film in the loop.

22. Apparatus for forming storage bags as recited in claim 21 wherein said first sealing means includes first and second spaced heating filaments that are parallel to the second axis and coextensive with the first and second sections of the margin portion and wherein said sealing jaw means includes means for supporting said first and second uninsulated filaments in alignment with the first sealing area and a second sealing area oppositely disposed with respect to the removable closure tie, said uninsulated filament being pulsed simultaneously with said partially insulated filaments.

23. Apparatus for forming storage bags as recited in claim 21 wherein said first sealing means includes first and second spaced heating filaments that are parallel to the second axis and coextensive with the first and second sections of the margin portion and wherein said sealing jaw means includes means for supporting said uninsulated filaments adjacent to said gripper means thereby to form transverse seals at the edges of the margin portion adjacent the contents pouches.

24. Apparatus for forming storage bags as recited in claim 23 wherein said perforation and severing means comprise reciprocally operating perforation and severing blade means respectively, one of said sealing jaw means supporting said perforation and severing blade means for reciprocating motion to advance said blade means toward the other sealing jaw means, said other sealing jaw means including recesses for receiving each of said perforation and severing blade means.

25. Apparatus for forming storage bags as recited in claim 18 wherein each of sealing jaw means is movable along a third axis transverse to the first and second axes and said gripper means on one of said sealing jaw means includes compressible means for clamping the film wall portions against said counterfacing gripper means.

26. Apparatus for forming storage bags as recited in claim 25 wherein each of said first and second sealing means includes first and second counterfacing sealing finger means that extend parallel to the second axis and each of said first and second sealing jaw means includes a sealing jaw body portion for supporting said first and second counterfacing sealing finger means, respectively, and wherein each of said first and second sealing jaw body portions is movable with and independently of said gripper means.

27. Apparatus for forming storage bags as recited in claim 26 wherein said first sealing jaw body portion further includes heating means for elevating the temperature of the first sealing jaw body portion and the first sealing finger means attached thereto.

28. Apparatus for forming storage bags as recited in claim 27 wherein each of said sealing finger means in said first sealing means extends parallel the second axis and is coextensive with the first and second sections thereby to form a seal at the contents pouch that traverses the storage bag.

29. Apparatus for forming storage bags as recited in claim 28 wherein each of said sealing fingers in said second finger means is coextensive with only the first section and each of said sealing jaw body portions carries an insulating insert means as an extension of the second sealing means that is coextensive with the second section.

30. Apparatus for forming storage bags as recited in claim 29 wherein said perforation and severing means comprise reciprocally operating perforation and severing blade means respectively, said first sealing jaw means supporting said perforation and severing blade means for reciprocating motion relative to said sealing jaw body portion to advance said blade means toward said second sealing jaw means, said second sealing jaw means including recesses for receiving each of said perforation and severing blade means.

31. Apparatus for forming storage bags as recited in claim 30 wherein said insulating insert means affixed to said first sealing jaw means includes an array of air passages for directing cooling air toward portions of said severing and perforation blade means.

32. Apparatus for forming storage bags as recited in claim 31 wherein said insulating insert means additionally includes an air passage for directing cooling air along the second axis toward the first section.

33. Apparatus for forming storage bags as recited in claim 28 wherein the margin portion additionally includes a second sealing area parallel to the first sealing area and oppositely disposed with respect to the removable closure tie from the first sealing area and wherein said first sealing means comprises first and second sets of counterfacing sealing finger means formed on said first and second sealing jaws for forming seals in the first and second sealing areas respectively that parallel said second axis and that are coextensive with the first and second sections thereby to form a pair of seals at the contents pouches of adjacent storage bags that traverse the storage bag.

34. Apparatus for forming storage bags as recited in claim 33 wherein said second sealing means comprises third and fourth counterfacing sealing fingers on said first and second sealing jaws for forming spaced, parallel seals in the releasable closure tie that are coextensive with the first section and wherein each of said sealing jaw body portions carries an insulating insert means as an extension of the sealing finger means in the second sealing means over a part of the margin portion that is coextensive with the second section.

35. Apparatus for forming storage bags as recited in claim 34 wherein said perforation and severing means comprise reciprocally operating perforation and severing blade means respectively, said first sealing jaw means supporting said perforation and severing blade means for reciprocating motion relative to said sealing jaw body portion to advance said blade means toward said second sealing jaw means, said second sealing jaw means including recesses for receiving each of said perforation and severing blade means.

36. Apparatus for forming storage bags as recited in claim 35 wherein said insulating insert means affixed to said first sealing jaw means includes an array of air passages for directing cooling air toward portions of said severing and perforation blade means.

37. Apparatus for forming storage bags as recited in claim 36 wherein said insulating insert means on said first sealing jaw means additionally includes an air passage for directing cooling air along the second axis toward the first section.

* * * * *